US011803517B2

(12) United States Patent
Lee et al.

(10) Patent No.: US 11,803,517 B2
(45) Date of Patent: Oct. 31, 2023

(54) FILE SYSTEM FOR ANONYMOUS WRITE

(71) Applicant: Microsoft Technology Licensing, LLC, Redmond, WA (US)

(72) Inventors: Scott Chao-Chueh Lee, Bellevue, WA (US); Rajsekhar Das, Sammamish, WA (US); Bryan Stephen Matthew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 842 days.

(21) Appl. No.: 16/399,910

(22) Filed: Apr. 30, 2019

(65) Prior Publication Data

US 2020/0349121 A1 Nov. 5, 2020

(51) Int. Cl.
*G06F 16/10* (2019.01)
*G06F 16/18* (2019.01)

(52) U.S. Cl.
CPC ...... *G06F 16/1805* (2019.01); *G06F 16/1865* (2019.01)

(58) Field of Classification Search
CPC .......... G06F 16/1805; G06F 16/1865
See application file for complete search history.

(56) References Cited

U.S. PATENT DOCUMENTS

| 10,417,190 B1* | 9/2019 | Donlan | G06F 16/10 |
| 2007/0276838 A1* | 11/2007 | Abushanab | G06F 16/10 |
| 2008/0005508 A1* | 1/2008 | Asano | G06F 3/0649 |
| | | | 711/161 |
| 2011/0161723 A1* | 6/2011 | Taleck | G06F 16/1748 |
| | | | 714/4.11 |
| 2016/0283125 A1 | 9/2016 | Hashimoto et al. | |
| 2017/0351428 A1 | 12/2017 | Liu | |
| 2017/0364266 A1* | 12/2017 | Xu | G06F 3/0688 |
| 2018/0232160 A1 | 8/2018 | Das et al. | |

OTHER PUBLICATIONS

"International Search Report and Written Opinion Issued in PCT Application No. PCT/US2020/026054", dated Jun. 22, 2020, 13 Pages.

Zhang, et al., "De-indirection for Flash-based SSDs with Nameless Writes", In Proceedings of the 10th USENIX conference on File and Storage Technologies, Feb. 14, 2012, 16 Pages.

* cited by examiner

*Primary Examiner* — Kristopher Andersen

(74) *Attorney, Agent, or Firm* — Han Gim; Newport IP, LLC

(57) ABSTRACT

A file system is implemented in a system comprising an anonymous-write storage device. A request for a file system operation that comprises semantics of the file system to receiving the request is received. The file system translates the file system operation to one or more commands that effect the file system operation while maintaining consistency with operation of the anonymous-write storage device. The one or more commands comprise one or more of updating file system metadata, sending a request to the anonymous-write storage device, or receiving a response from the anonymous-write storage device. The anonymous-write storage device is configured to write data in an append-only format and determine locations of data write operations agnostic of input of a write location from the file system. Metadata is updated to indicate results of the file system operation.

20 Claims, 22 Drawing Sheets

| Zone 3 530 | File 5 Part 3 570 | Unused Area 534 |

| Zone 2 520 | File 5 Part 2 560 |

| Zone 1 510 | File 5 Part 1 550 |

FIG. 5C

FILE SYSTEM FOR ANONYMOUS WRITE

BACKGROUND

A host system such as a computer or a server may be configured to interact with a file system to perform operations in association with stored files (e.g., open a file, delete a file, write to a file, read from a file, replace a file, copy a file, move a file, search for a file, create a file, etc.). The file system is used to control how files and data are stored and retrieved on the system. There are a variety of different file systems for use with different applications or operating systems. File systems can be used with different types of storage devices that use different kinds of media, such as hard disk drives, SSDs, optical discs, and storage-class memory (SCM). The physical layer of the file system may interact directly with the physical device.

It is with respect to these and other considerations that the disclosure made herein is presented.

SUMMARY

The disclosure describes technologies that enable implementation of a file system configured to interact with an anonymous write storage device while supporting conventional file operations, such as read, write, create, and delete. An anonymous write storage device may be an append-only device or more generally any device that performs serial writes. An append-only storage system or scheme is one where data writes are serially appended to the end of the storage area. In general, previously written data can be accessed but is typically not modified. The last committed transaction is tracked to maintain the end of the current storage area, and pointers to locations in the storage area where the data is stored is also maintained. For example, in an append-only storage system, new data or files may be serially added to the storage system at the next available block at a specified offset. New data or files are added without updating or overwriting previously stored data or files. The last committed transaction may be used to determine the next write location.

In an anonymous write system, storage requests do not specify an offset for write requests. Rather, a general zone or other defined portion of an append-only storage area is identified, along with the data or file that is to be written. The anonymous write system determines the next available offset and writes the data or file at that location. The anonymous write system returns the offset of the stored data or file. The requesting system, therefore, is only notified of the offset after the data or file is written and the anonymous write system returns the offset. Therefore, the requesting system does not know the offset of stored data until after the anonymous write system reports back where the file or data is written. A file system that uses an anonymous write system must therefore provide various mechanisms to allow typical file system operations such as read, write, create, and delete operations to be managed and tracked.

Such a system may provide substantial benefits in terms of file management overhead. For example, SSDs are limited in the sense that data can only be erased from the storage device in blocks, also known as "erase blocks." These blocks may contain, in addition to data that a user wishes to erase, important data that the user wishes to keep stored on the SSD. In order to erase the unwanted data, the SSD must perform a process known as "garbage collection" in order to move data around on the SSD so that important files are not accidentally deleted. However, this process may result in an effect known as "write amplification" where the same data is written to the physical media on the SSD multiple times, shortening the lifespan of the SSD. Such issues may be avoided by implementing an append-only scheme on an SSD device, for example in an anonymous write system. In an embodiment, an anonymous write device may be implemented by an SSD device that does not use indirection. Such a device may assign any physical location to a write and returning the actual location to the calling application. Without the need for indirection the complexity of the device may be reduced.

Various embodiments are disclosed that provide a way for a file system to interact with an anonymous write storage device while providing conventional file operations, such as read, write, create, and delete. Such an anonymous write storage device may be an append-only device or more generally any device that can only perform serial writes. The invention may be implemented with any file system that is configured to support file operations while interacting with anonymous write semantics, where the location of a I/O write request will not be known until the write has been executed. The anonymous write storage device returns an offset after completion of the write request, which the file system can then record for future operations such as a read operation. The record of offsets and other file management data may be saved as metadata in a known location, and thus may be stored in a device other than the anonymous write storage device.

In an embodiment, a file create operation may be implemented by creating and storing metadata artifacts that indicate the creation of a file or document. In some embodiments, the file create operation may be implemented by configuring the file system to receive an offset where the created file is located. The created file may be stored at the corresponding logical address.

In an embodiment, a file read operation may be implemented by configuring the file system to provide the offset for the file to the anonymous write storage device. The anonymous write storage device may return the stored data.

In an embodiment, a file write operation may be implemented by configuring the file system to determine a file system entry in the file system namespace for the file to be written. The file system may translate the file system entry to the file system's logical address scheme and allocate a number of storage blocks that correspond to the size of the written file. The file system may send the write request to the anonymous write storage device. The anonymous write storage device may store the file or data and return the offset where the data was actually written.

In an embodiment, a file delete operation may be implemented by configuring the file system to provide the offset and size of the file to be deleted to the anonymous write device. The anonymous write device may delete the requested file. For example, the file system may send a request to delete a specified zone. In configurations where each file is allocated to one zone, deletion of the contents of the zone will result in the file being deleted. In configurations where a file is allocated across multiple zones, deletion of the contents of each of the associated zones will result in the file being deleted.

In configurations where two or more files share the same zone, the zone can be associated with a reference count indicating how many files is stored in the zone. Since the contents of the zone cannot be deleted because the zone still contains data, the file system may update its metadata to indicate that the file has deleted status and is not allocated. When other files in the zone are deleted, then the file system may request that the contents of the zone be deleted. In this way, the file system may manage file operations whether there are many files to one zone, one file to one zone, or one file to many zones.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

FIG. 5C is an example diagram depicting storage allocations in an anonymous write storage system.

DETAILED DESCRIPTION

The following Detailed Description describes technologies that enable implementation of a file system configured to interact with an anonymous write storage device while supporting conventional file operations, such as read, write, create, and delete. An anonymous write storage device may be an append-only device or more generally any device that performs serial writes. An append-only storage system or scheme is one where data writes are serially appended to the end of the storage area. In general, previously written data can be accessed but is typically not modified. The last committed transaction is tracked to maintain the end of the current storage area, and pointers to locations in the storage area where the data is stored is also maintained. For example, in an append-only storage system, new data or files may be serially added to the storage system at the next available block at a specified offset. New data or files are added without updating or overwriting previously stored data or files. The last committed transaction may be used to determine the next write location.

Figure 1:
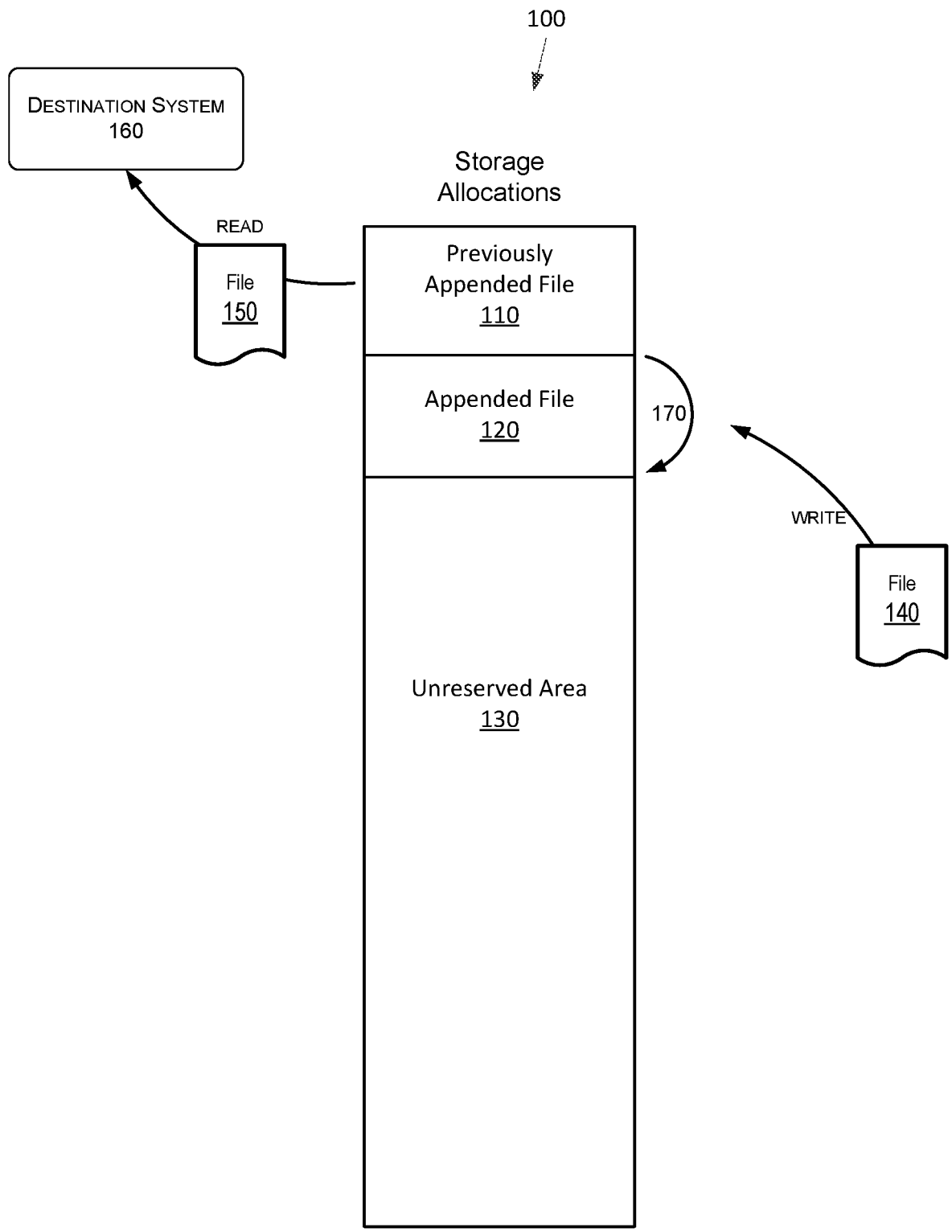
FIG. 1 is an example diagram depicting an append only file system.

FIG. 1 illustrates an example of an append-only storage system. A storage area 100 includes a previously append file 110. A file 140 is to be written to storage area 100. The file 140 is appended at a current offset which is moved to indicate a new offset 170 after the file 140 is appended. The unreserved area 130 indicates additional unallocated storage space for future append operations. Previously appended file 110 may be read via a request for file 150 by destination system 160. In some embodiments, read requests can be made independently of write requests.

Append only systems can avoid write contention or dependency among locked data entries. Furthermore, previously written data need not be overwritten, and read operations can be performed independently of write operations. An append-only system thus allows for simpler file management overhead, but does not allow for changes to previously stored data or files. In some implementations, an append-only system does not allow for deletions of previously stored data.

In an anonymous write system, a storage system uses an append-only storage system as described. Storage requests, however, do not specify an offset for write requests. Rather, a general zone or other defined portion of an append-only storage area is identified, along with the data or file that is to be written. The anonymous write system determines the next available offset and writes the data or file at that location. The anonymous write system returns the offset of the stored data or file. The requesting system, therefore, is only notified of the offset after the data or file is written and the anonymous write system returns the offset. Therefore, the requesting system does not know the offset of stored data until after the anonymous write system reports back where the file or data is written.

A file system that uses an anonymous write system must therefore provide various mechanisms to allow typical file system operations such as read, write, create, and delete operations to be managed and tracked.

Figure 2:
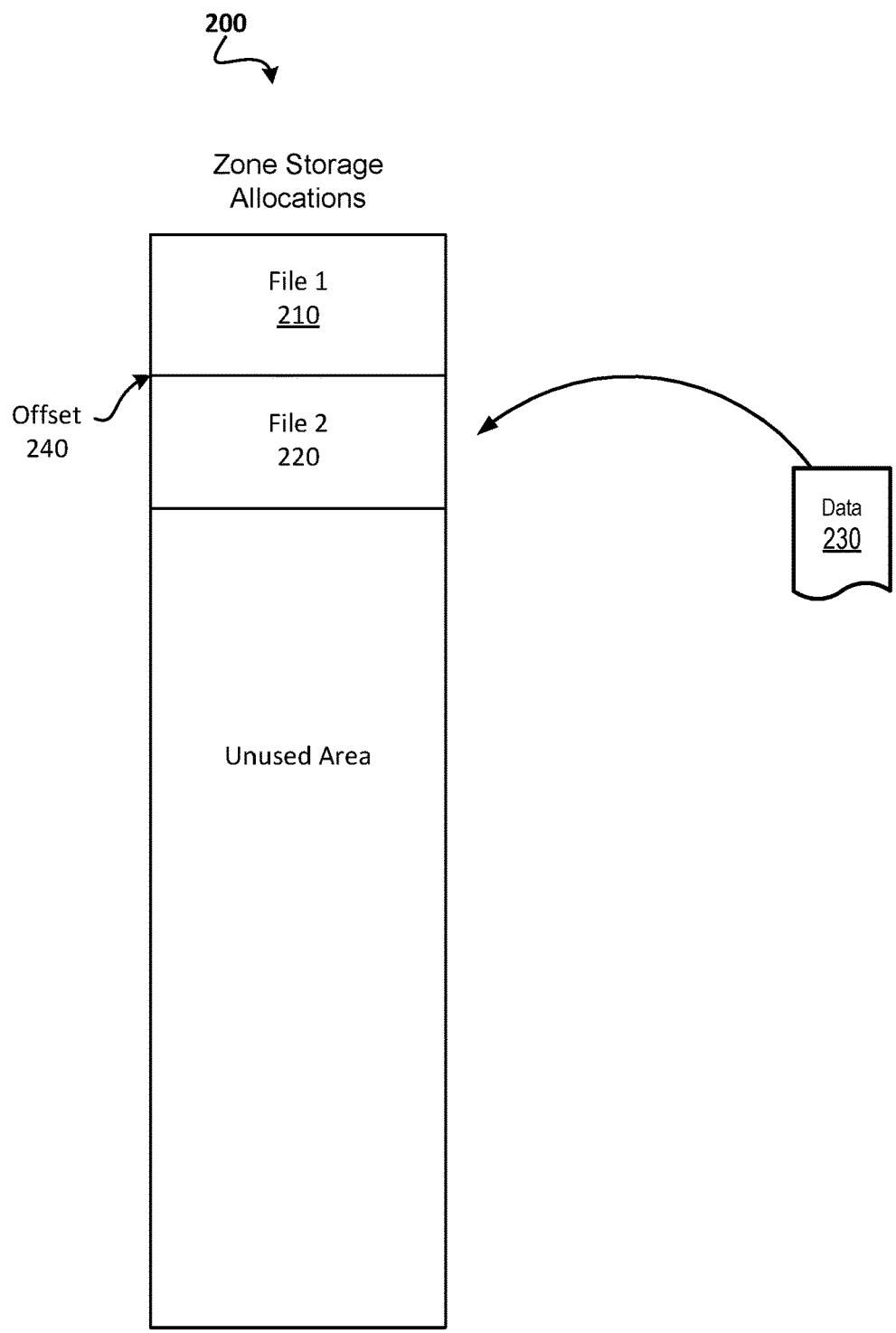
FIG. 2 is an example diagram depicting an append only file system.

In the example shown in FIG. 2, a zone 200 of an anonymous write system is illustrated. The zone 200 may have a previously appended file 210. When data 230 is to be written, it may be appended at the next available offset 240 and stored as file 220. The offset 240 may be reported to the requesting application or service. FIG. 2 depicts one embodiment where multiple files may be written to a zone. In other embodiments, one zone may be used to store one file. In further embodiments, a file may be spread over multiple zones. The zones may be of various sizes.

Figure 3:
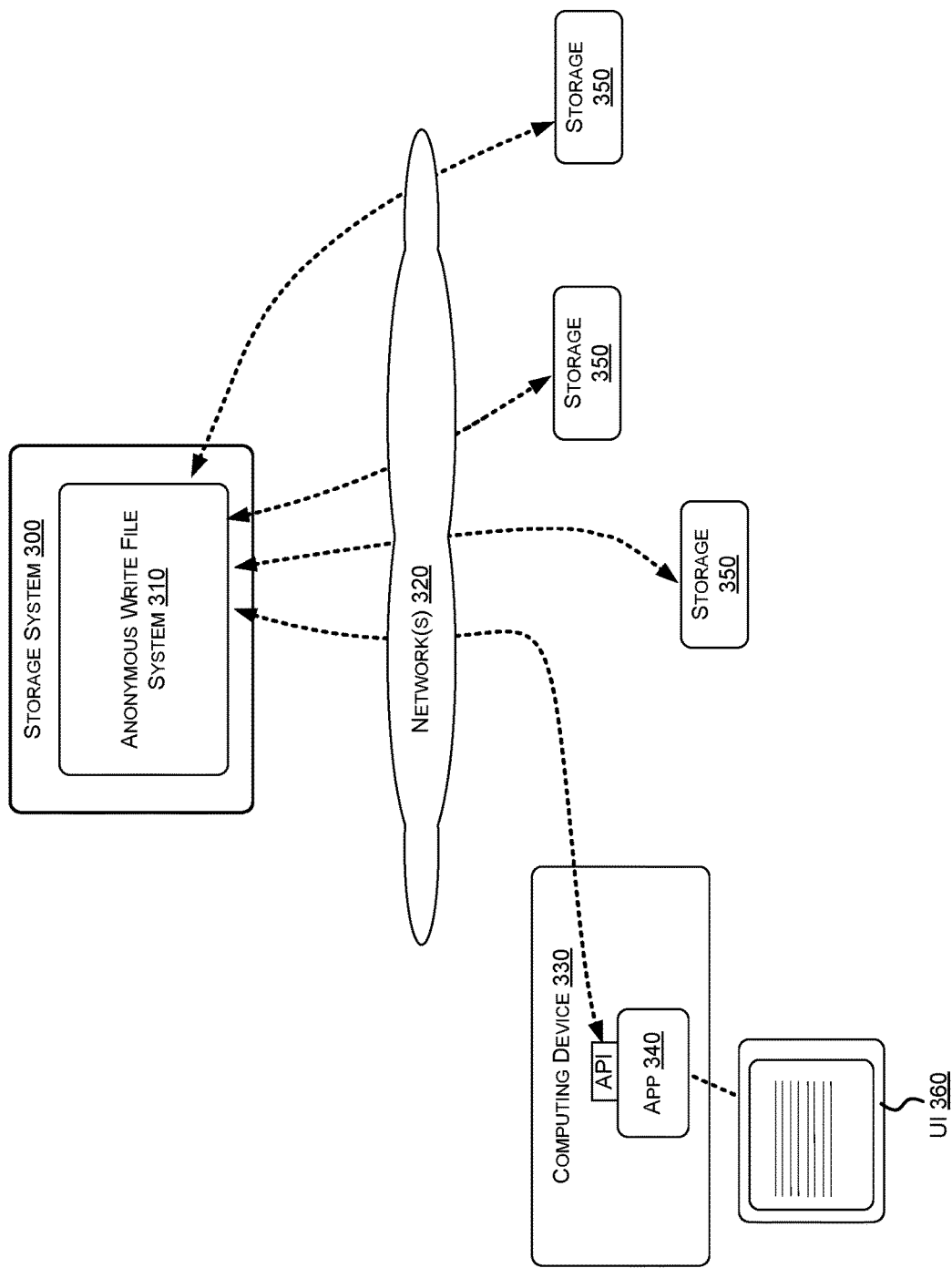
FIG. 3 is an example diagram depicting a system implementing aspects of the present disclosure.

In the example shown in FIG. 3, a storage system 300 is illustrated that implements an anonymous write file system 310. The anonymous write file system 310 may be configured to manage storage services on various underlying anonymous write storage devices 350 over a network 320. A user interface (UI) 360 may be provided on a user computing device 330. The user interface 360 may be provided in conjunction with an application 340 that communicates to the anonymous write file system 310 using an API via network 320. In some embodiments, anonymous write file system 310 may be configured to abstract details of the underlying storage devices 350, enabling typical file system operations such as create, store, read, and delete operations while abstracting the details of the anonymous write storage devices.

Figure 4:
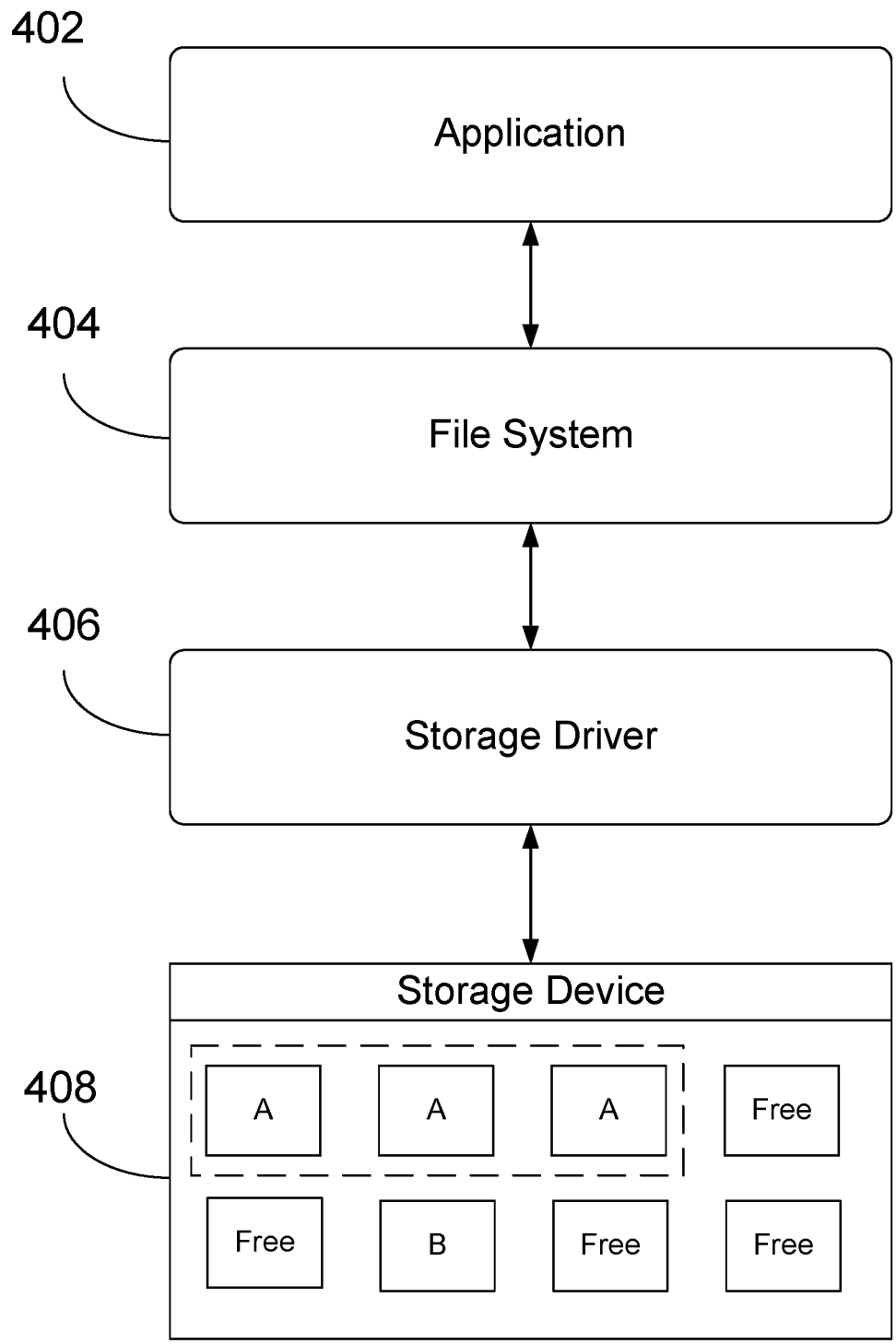
FIG. 4 is an example diagram a storage stack and storage devices in accordance with the present disclosure.

FIG. 4 is a block diagram illustrating example components of an architecture for implementing at least some of the functionality disclosed herein. As shown, in one embodiment, the architecture may comprise an application 402, a file system 404, a storage driver 406, and a storage device 408.

The application 402 may be configured to read and write files to the device 408 by communicating with the file system 404. The file system 404 may be configured to abstract details of the storage device 408 and the storage driver 406. In order to append data, the application 402 may instruct the file system 404 an identifier of a file or data. The file system 404 may determine which ID to associate with the file or data.

In some embodiments, the file system 404 may be configured to expose an application programming interface (API) to the application 402. For example, the application 402, via an API provided by the file system 404, may be configured to request that a file or data be stored. The file system 404 may tag the file or data with a particular ID. The file system 404 may be further configured to store metadata associated with each file of the device 408, and to further store the particular ID associated with each file along with the file metadata.

The storage driver 406 may be configured to expose an API to the file system 404. For example, the file system 404, via an API provided by the storage driver 406, may be configured to enable read/write functionality on the storage device 408. The file system 404, via an API provided by the storage driver 406, may be further configured to discover existing stored data on the device 408. The file system 404, via an API provided by the storage driver 406, may be further configured to obtain information from the device such as, for example, the ability of the device to support append-only storage schemes. The file system 404 may be configured to communicate with the storage driver 406 and to expose device agnostic interfaces to the application 402 so that the file system 404 may communicate with the storage driver 406 without the application 402 knowing the details of the particular device.

The device 408 may comprise, for example, an SSD. The SSD illustrated in FIG. 4, for example, comprises eight erase blocks. Data may be written individually to a given block or may be striped across a plurality of the blocks in order to maximize throughput on the SSD.

The file system 404 may send storage requests, read requests, and delete requests to the device 408. The file system 404 may receive offsets indicating storage locations for data and files stored at the device 408. The file system 404 may generate metadata for a data object indicating that the data object is an append-only object and mapping the physical storage location of the data object to the identifier. The file system 404 may translate a storage request, read request, or delete request to one or more instructions for implementing the request using an anonymous write scheme. The file system 404 may cause the data object to be stored at the physical storage location using the anonymous write storage scheme.

In an embodiment, the anonymous write system may partition storage areas into zones. A zone may a way to organize the device, and the size of a zone may be determined based on read/write management efficiencies and other factors. A device may have a number of zones, where files may be written at the front of the zone and data may continue to be written ep writing serially.

In one embodiment, the file system may identify a zone for storing a file or data, and the anonymous write system may return the offset within that zone where the file or data was written. In one example, the file system may have one file map to one zone. The file system may maintain logical to physical mapping.

The file system may generate and store metadata associated with the file or data. The metadata may comprise the identifier associated with the file or data. The metadata may also maintain the location on the storage device where the file was stored. For example, the metadata may take the form of a file mapping table, defining the offset, logical block address (LBA) and length of all data associated with a given file.

In one embodiment, some or all of the metadata may be stored in a conventional storage device and not an anonymous device. At least a portion of the metadata typically needs to be written in place, such as reallocatable data such as checkpoints. Other aspects of the metadata may be stored in the anonymous storage device in some embodiments.

The anonymous write system semantics may be hidden from the user by the file system. In an embodiment, an application programming interface (API) may be provided to provide file system functionality on top of the anonymous write system.

Figure 5A:
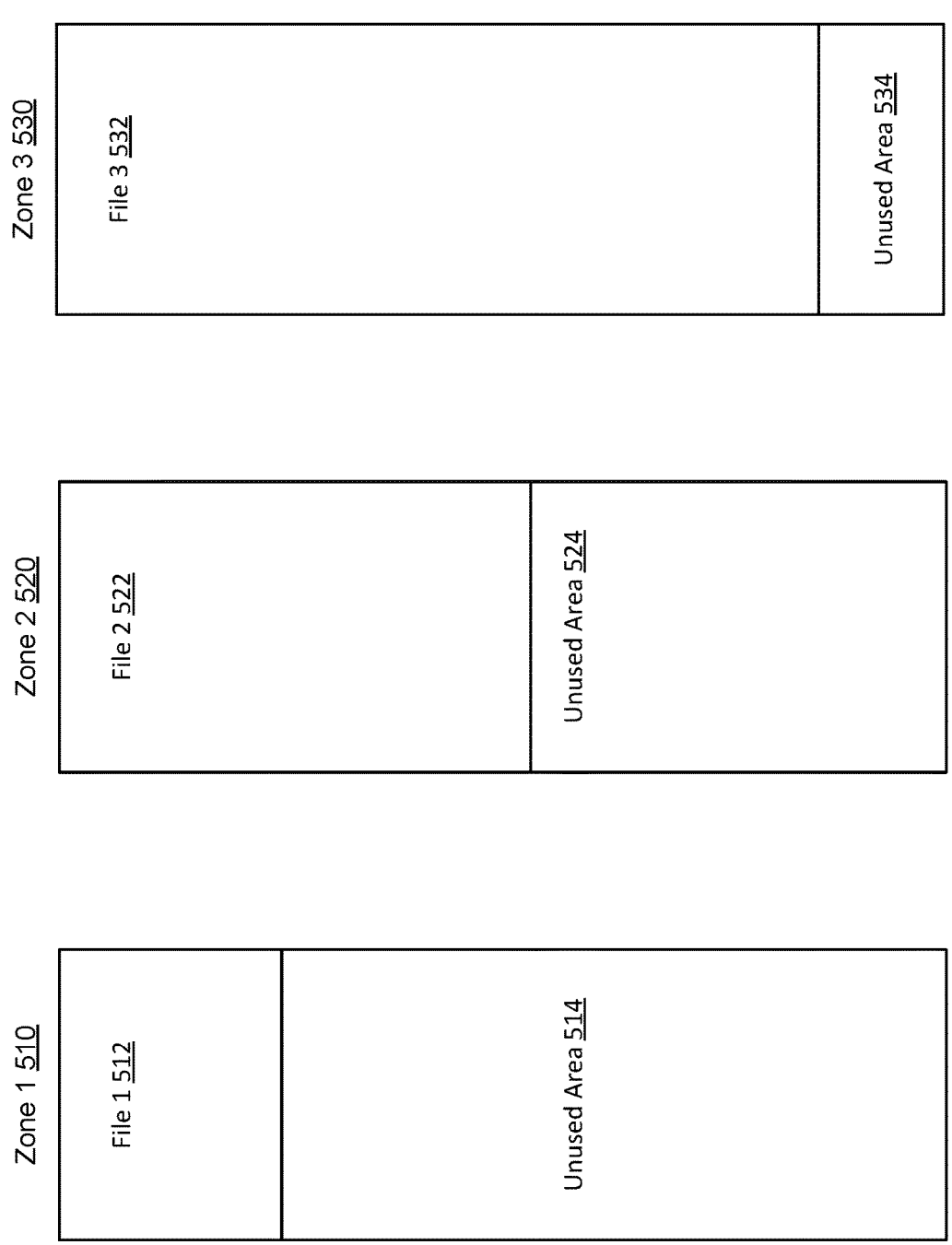
FIG. 5A is an example diagram depicting storage allocations in an anonymous write storage system.

In the example shown in FIG. 5A, illustrated are three zones 510, 520, and 530 of an anonymous write storage device. Zone 1 510 may store a file 1 512 with unused area 514. Zone 2 520 may have a file 2 522 stored in the zone, with unused area 524. Zone 3 530 may have a file 2 532 stored in the zone, with unused area 534. In this example, one file is allocated per zone.

Figure 5B:
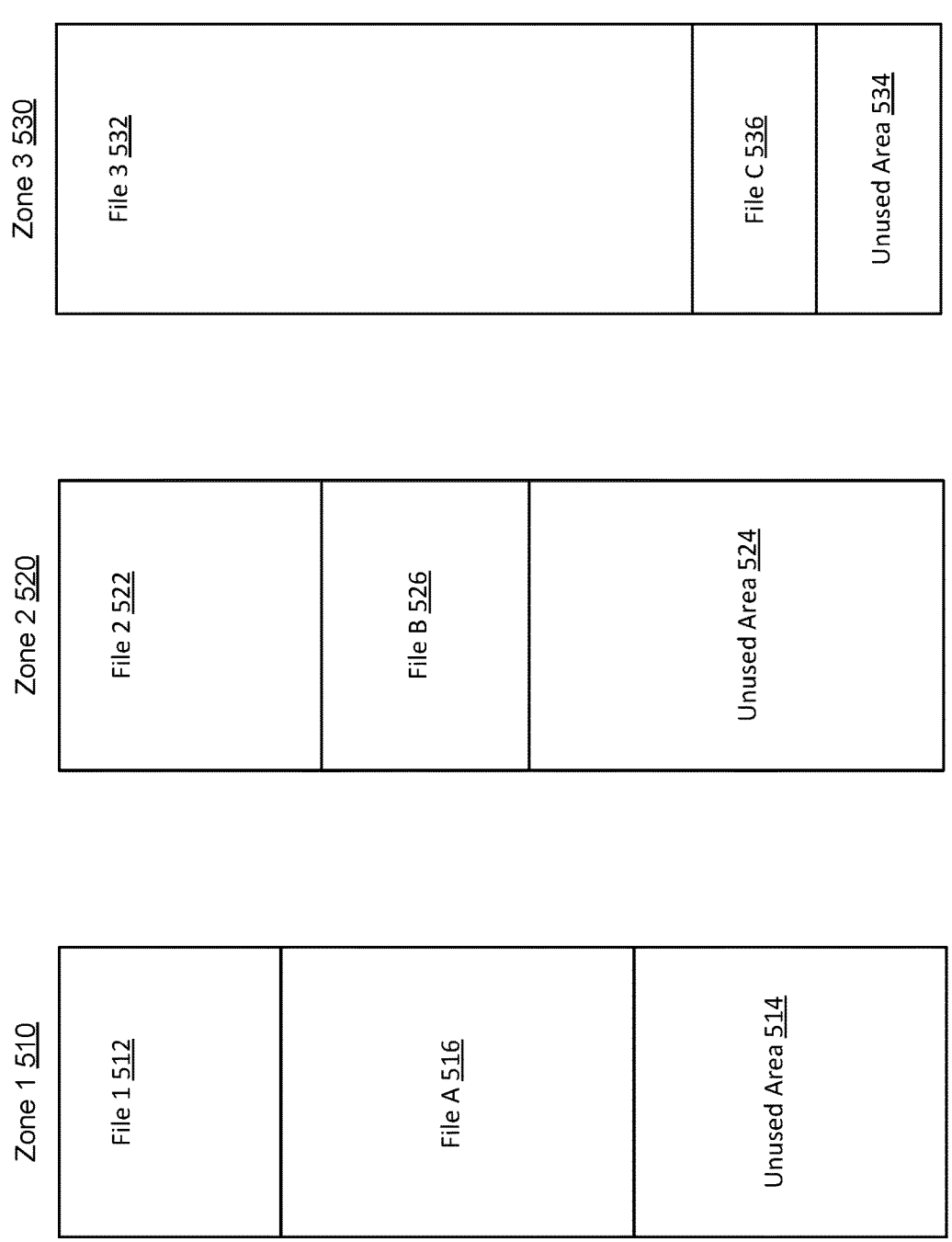
FIG. 5B is an example diagram depicting storage allocations in an anonymous write storage system.

In the example shown in FIG. 5B, illustrated are three zones 510, 520, and 530 of an anonymous write storage device, where each zone is configured to store more than one file. Zone 1 510 may store a file 1 512 and file A 516 with unused area 514. Zone 2 520 may have a file 2 522 stored in the zone as well as file B 526 with unused area 524. Zone 3 530 may have a file 2 532 and file C 536 stored in the zone, with unused area 534.

In the example shown in FIG. 5C, illustrated are three zones 510, 520, and 530 of an anonymous write storage device, where a file 5 is too large to be stored in a single zone and is thus stored across the three zones 510, 520, and 530.

Zone 1 510 may store a file 5 part 1 550. Zone 2 520 may store file 5 part 2 560. Zone 3 may store file 5 part 3 570, with unused area 534.

By providing an anonymous write file system, append-only functionality can be provided to users regardless of where the data is actually stored and the specific device where the data is stored. In another aspect, in an anonymous write file system, the abstraction of the underlying storage devices enables the storage system to optimize storage services provided to users, as well as enabling the storage system to increase operational efficiencies by balancing the usage of specific storage devices. For example, storage requests may be translated into optimal writes/commits based on the available underlying devices of the storage service. For example, an SSD may be used with zoned namespaces, where data can only be appended to the end of the current zone. The storage service may manage the use of zones and hide the specification of zones from the user. Alternatively, the zone layout of a particular device may be abstracted to logical zones that can be presented to the user. The anonymous write file system may translate the logical zones to the actual physical zones of the particular devices.

In an embodiment, a storage stack can be implemented that can simulate a file system while hiding the details of the underlying anonymous write devices. By abstracting details of the underlying devices whether they are anonymous write devices or actual random-access devices, the storage service provider may provide a plurality of storage services over a plurality of storage devices and device types, enabling flexibility in service offerings while at the same time enabling flexibility with regard to device usage and management.

The disclosed embodiments thus provide a way to translate file system operations into optimal writes/commits to underlying storage devices regardless of the type of the storage device. For example, the file system may include functionality to translate I/O requests and optimize how the requests are executed to balance service level agreements and operational efficiencies and priorities for the storage system. Because the details of the underlying storage device are abstracted from the user, the storage stack may store the data so as to maximize throughput and allow for fast write commitments as a priority over fast retrievals. In this way, the I/O operations may be optimized for quality of service while achieving cost savings by using the anonymous write device or random-access devices as needed.

Individual blobs can be tagged with metadata that defines whether the blob is to be stored as a random-access object or an append-only object. The file system can enforce the tagged capabilities of each blob.

The described embodiments may be implemented with any storage system that is configured to support file operations while interacting with anonymous write semantics, where the physical location of a I/O write request will not be known until the write has been executed. The anonymous write storage device returns an offset after completion of the write request, which the file system can then record for future operations such as a read operation. The record of offsets and other file management data may be saved as metadata in a known location.

One problem is that when using an anonymous storage system, the file system specifies data that is to be stored, but does not specify the specific location where the data is to be stored. The anonymous write file system needs to support operations such as create/delete if an anonymous storage system is to be used. Previously, file systems manage each file operation along with the overhead required to track and manage file allocations.

When using an anonymous storage system, the file system specifies data that is to be stored, but does not specify the specific location where the data is to be stored. The file system may specify a selectable zone or region, but the anonymous storage system determines the actual storage location and returns the location to the file system. For example, the anonymous storage system may provide the offset where the data is stored. Such a system thus allows for simpler file management overhead, but requires changes to how the file system handles file operations. Such a system may provide substantial benefits in terms of file management overhead. For example, SSDs are limited in the sense that data can only be erased from the storage device in blocks, also known as "erase blocks." These blocks may contain, in addition to data that a user wishes to erase, important data that the user wishes to keep stored on the SSD. In order to erase the unwanted data, the SSD must perform a process known as "garbage collection" in order to move data around on the SSD so that important files are not accidentally deleted. However, this process may result in an effect known as "write amplification" where the same data is written to the physical media on the SSD multiple times, shortening the lifespan of the SSD. Such issues may be avoided by implementing an append-only scheme on an SSD device, for example in an anonymous write system.

Various embodiments are disclosed that provide a way for a file system to interact with an anonymous write storage device while providing conventional file operations, such as read, write, create, and delete. Such an anonymous write storage device may be an append-only device or more generally any device that can only perform serial writes. The invention may be implemented with any file system that is configured to support file operations while interacting with anonymous write semantics, where the location of a I/O write request will not be known until the write has been executed. The anonymous write storage device returns an offset after completion of the write request, which the file system can then record for future operations such as a read operation. The record of offsets and other file management data may be saved as metadata in a known location, and thus may be stored in a device other than the anonymous write storage device. For example, the metadata may be stored at a conventional block access device. By only storing this metadata in place, the requirement for a random access write area can be significantly reduced.

The disclosed technologies represent a substantial advantage over existing file systems which are not configured to implement a file system in conjunction with an anonymous write system. Among many other technical benefits, the technologies herein enable more efficient use of computing resources such as processor cycles, memory, network bandwidth, and power, as compared to file systems which are not configured to work with and take advantage of the benefits of an anonymous write system as noted herein. Other technical benefits not specifically mentioned herein can also be realized through implementations of the disclosed subject matter.

Figure 6:
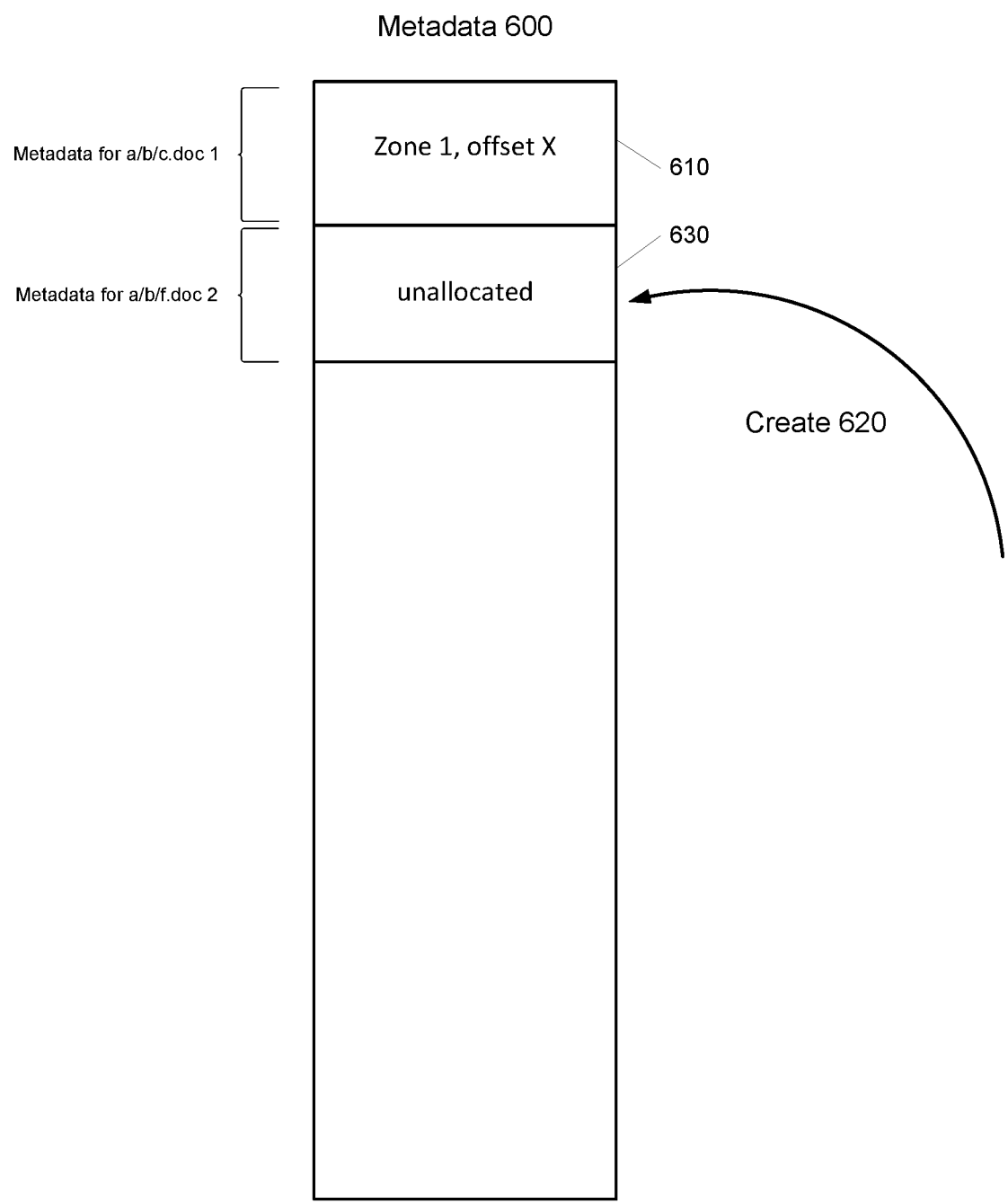
FIG. 6 is an example diagram depicting implementation of a file create operation.

In an embodiment, a file create operation may be implemented by creating and storing metadata artifacts that indicate the creation of a file or document. In some embodiments, the file create operation may be implemented by configuring the file system to receive an offset where the created file is located. The created file may be stored at the corresponding logical address. For example, FIG. 6 illustrates one example of a file create operation in accordance with the present disclosure. Illustrated is metadata 600 that includes metadata for a file a/b/c.doc which is stored in location 610 indicating that the file is stored at zone 1 at an offset X. A file create operation 620 is received to create a document a/b/f.doc. The file create operation 620 is implemented by creating metadata at location 620 which currently indicates that the file is not yet allocated to a storage location. The document may thus be created at a file system location a/b/f.doc via creating metadata. If the information and document data is further sent to the anonymous write device, the offset of the stored file may be returned, and the file system may associate a/b/f.doc with the zone and offset for the stored file.

In one example, a logical mapping may be maintained to track the logical offset to where a file is located on the anonymous write storage device. The location is the zone and offset provided by the anonymous write storage device in response to being provided the data, zone, and size of the file by the file system. Depending on the device, a block number may also be recorded.

Figure 7:
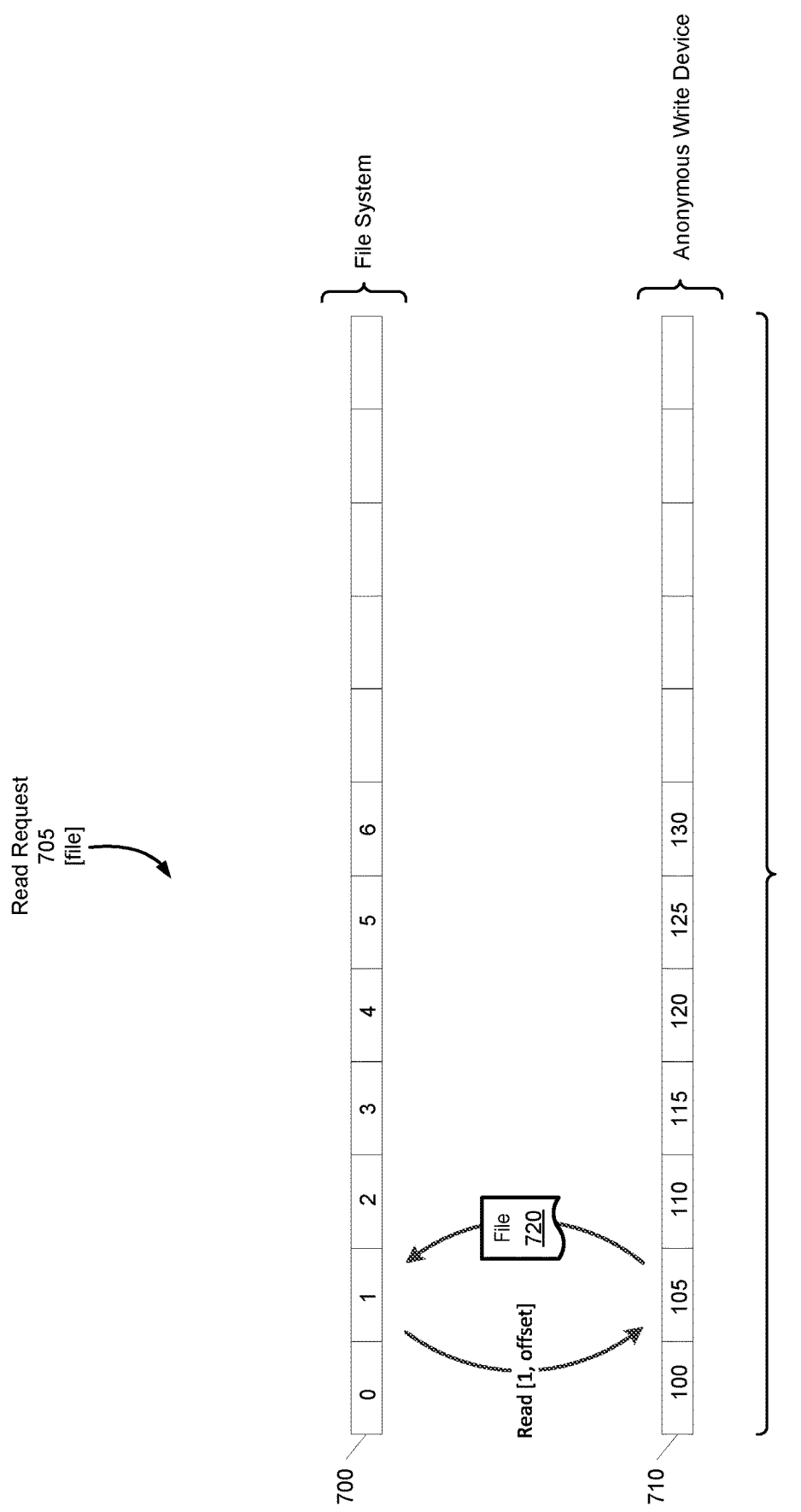
FIG. 7 is an example diagram depicting implementation of a file read operation.

In an embodiment, a file read operation may be implemented by configuring the file system to provide the offset for the file to the anonymous write storage device. The anonymous write storage device may return the stored data. For example, FIG. 7 illustrates one example of a file create operation in accordance with the present disclosure. In the figure, a read request 705 is received for a file. The file system may have a mapping 700 of logical block addresses that may be associated with file system entries such as files or data. In this example, the file system may translate the read request to a request to the anonymous write device, where the request includes a zone (zone 1 in this example) and an offset. The anonymous write device may return the file or data 720 that is stored at the requested offset. The actual physical offset where the file or data 720 is stored in the physical block mapping 710 of the anonymous write device is mapped by the file system so that the logical block address associated with the file or data 720 at file system mapping 720 is associated with the corresponding physical block address at anonymous write device mapping 710.

In an embodiment, a file write operation may be implemented by configuring the file system to determine a file system entry in the file system namespace for the file to be written. The file system may translate the file system entry to the file system's logical address scheme and allocate a number of storage blocks that correspond to the size of the written file. The file system may send the write request to the anonymous write storage device. The anonymous write storage device may store the file or data and return the offset where the data was actually written. The size may be implicit, where the anonymous write device stores the data or file in its entirety unless there is an error (e.g., the file size exceeds the available space). In some embodiments, the file is either successfully written, or the operation fails. Extended writes, where there is no previous allocation, may be recorded in the metadata. For overwrites, the existing entry may be recorded with a new offset.

Figure 8:
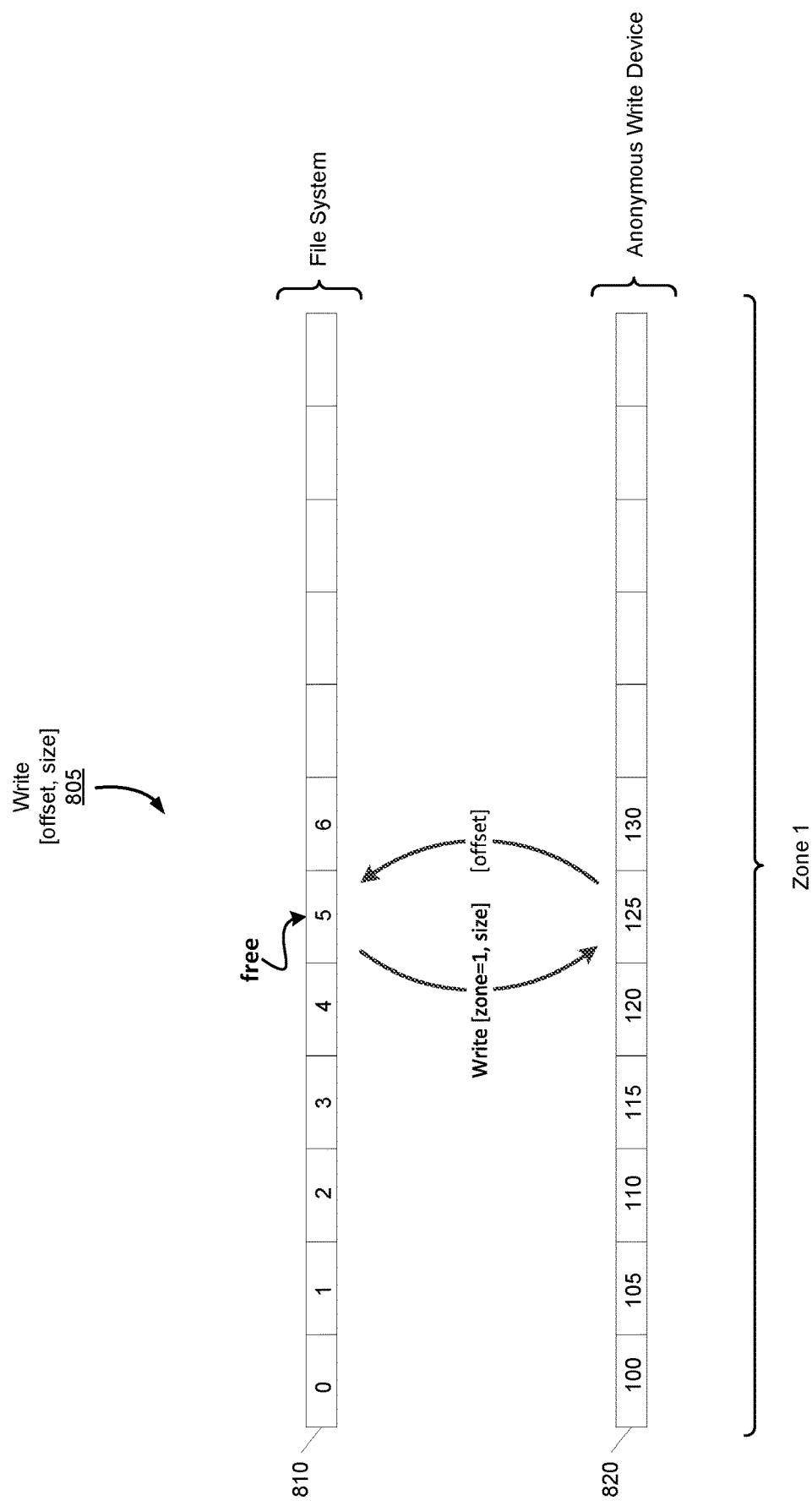
FIG. 8 is an example diagram depicting implementation of a file write operation.

For example, FIG. 8 illustrates one example of a file write operation in accordance with the present disclosure. In the figure, a write request 805 is received for a file. The file system may have a mapping 810 of logical block addresses that may be associated with file system entries such as files or data. In this example, the file system may translate the write request to a request to the anonymous write device, where the request includes a zone (zone 1 in this example) and a size of the file. The anonymous write device may return the offset where the file was stored. The physical offset where the file was stored in the physical block mapping 820 of the anonymous write device is mapped by the file system so that the logical block address associated with the file or data at file system mapping 810 is associated with the corresponding physical block address at anonymous write device mapping 820.

Figure 9:
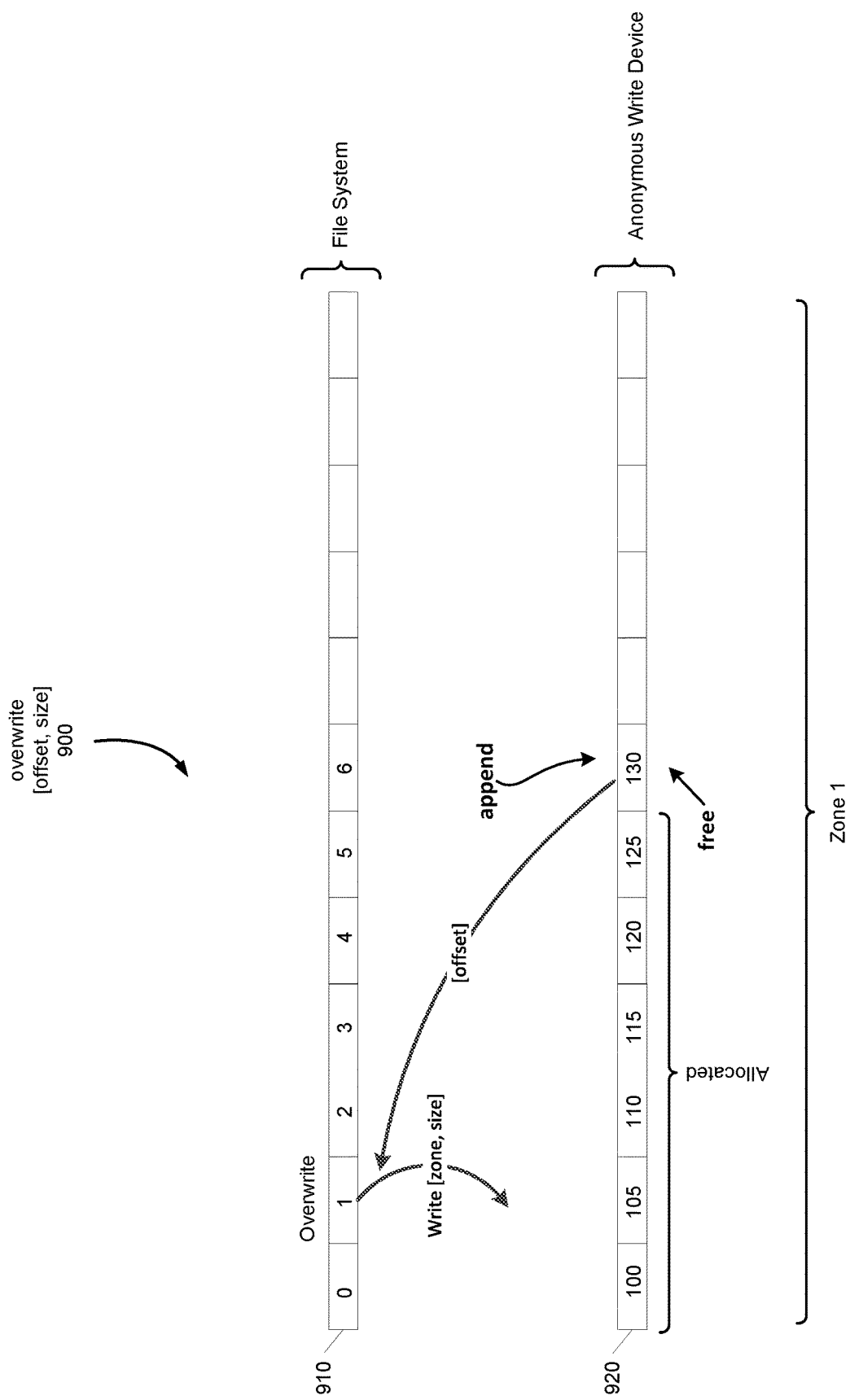
FIG. 9 is an example diagram depicting implementation of a file overwrite operation.

For example, FIG. 9 illustrates one example of a file write operation that involves an overwrite of an existing location as indicated by the file system in accordance with the present disclosure. In the figure, an overwrite request 900 is received for a file. The file system may have a mapping 910 of logical block addresses that may be associated with file system entries such as files or data. In this example, the file system may translate the overwrite request to a write request to the anonymous write device, where the request includes a zone (zone 1 in this example) and a size of the file. The anonymous write device may return the offset where the file was stored. The physical offset where the file was stored in the physical block mapping 920 of the anonymous write device is mapped by the file system so that the logical block address associated with the file or data at file system mapping 910 that is to be overwritten is associated with the corresponding physical block address at anonymous write device mapping 920. Since the anonymous write device only appends data and does not overwrite previously appended data, the overwrite request results in the data being appended at the next available offset in the anonymous write device. The file system associates this offset with the existing logical location in the file system that is to be overwritten.

In an embodiment, after the file or data is stored on the anonymous write device and acknowledgement is received by the file system from the device, metadata may be updated to map the reported physical location with the file system logical location. In some cases, the metadata write may fail. In this case, the data or file stored on the device may not be recorded and thus the stored data or file in effect does not exist from the file system's perspective, resulting in loss of the written space on the device. In one embodiment, a strict write mode may be implemented, where the file system reserves metadata space for recording intended writes. When a write request is received, the file system determines if space was reserved and available for recording the write, or otherwise verify that the metadata can be written end-to-end. The data or file can then be sent to the write device for storage. In this way, leaked storage issues can be avoided.

In an embodiment, a file delete operation may be implemented by configuring the file system to provide the offset and size of the file to be deleted to the anonymous write device. The anonymous write device may delete the requested file. For example, the file system may send a request to delete a specified zone. In configurations where each file is allocated to one zone, deletion of the contents of the zone will result in the file being deleted. In configurations where a file is allocated across multiple zones, deletion of the contents of each of the associated zones will result in the file being deleted.

In configurations where two or more files share the same zone, the zone can be associated with a reference count indicating how many files is stored in the zone. Since the contents of the zone cannot be deleted because the zone still contains data, the file system may update its metadata to indicate that the file has deleted status and is not allocated. When other files in the zone are deleted, then the file system may request that the contents of the zone be deleted. In this way, the file system may manage file operations whether there are many files to one zone, one file to one zone, or one file to many zones.

Figure 10:
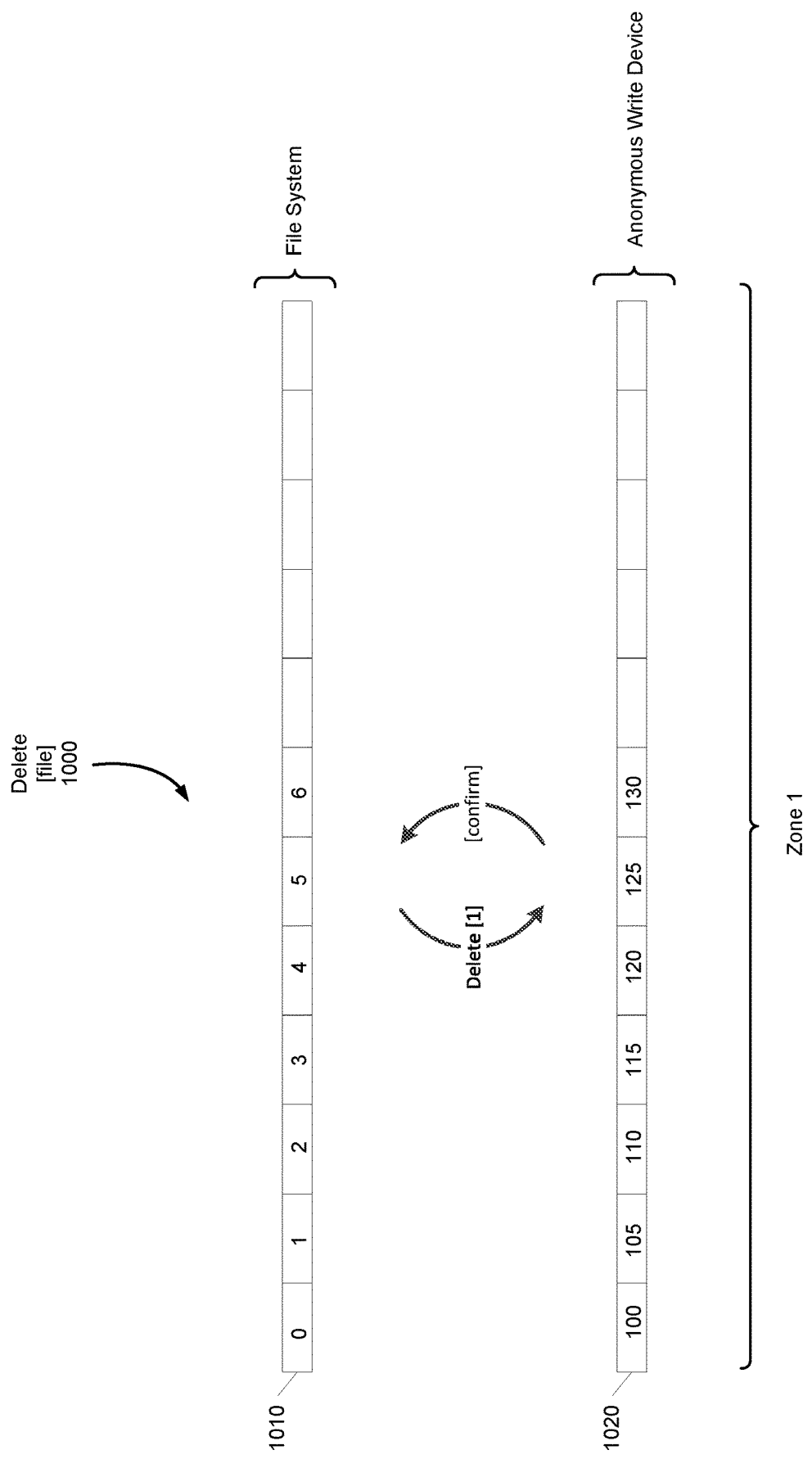
FIG. 10 is an example diagram depicting implementation of a file delete operation.

For example, FIG. 10 illustrates one example of a file delete operation in accordance with the present disclosure. In the figure, a delete request 1000 is received for a file. The file system may have a mapping 1010 of logical block addresses that may be associated with file system entries such as files or data. In one embodiment, if the anonymous write device does not delete previously written data, then the file system may update its metadata to indicate that the file has been deleted, and make corresponding changes to the logical mapping 1010.

If the anonymous write device supports delete operations, then in this embodiment, the file system may translate the delete request to a request to the anonymous write device. If the anonymous write device is configured to store one file per zone, then the request may include a zone (zone 1 in this example) to be deleted. The anonymous write device may confirm that the zone was deleted. The physical offset where the file was stored in the physical block mapping 820 of the anonymous write device is mapped by the file system so that the logical block address associated with the file or data at file system mapping 810 is associated with the corresponding physical block address at anonymous write device mapping 820.

Figure 11:
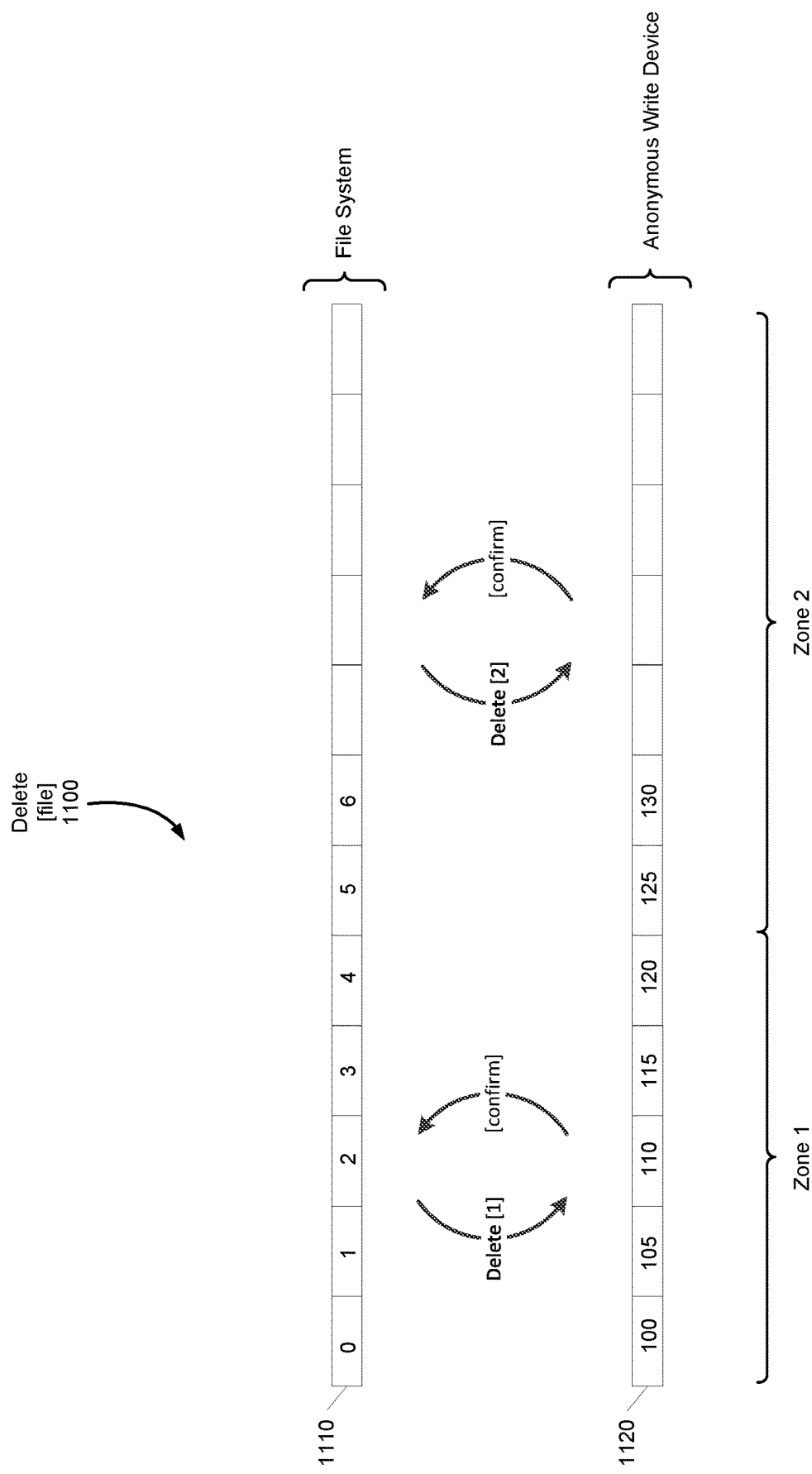
FIG. 11 is an example diagram depicting implementation of a file delete operation.

FIG. 11 illustrates an example where a file is allocated across multiple zones. In this example, deletion of the contents of each of the associated zones will result in the file being deleted. In the figure, a delete request 1100 is received for a file. The file system may have a mapping 1110 of logical block addresses that may be associated with file system entries such as files or data. The file system may translate the delete request to multiple requests to the anonymous write device. The first request may include a zone (zone 1 in this example) to be deleted. The anonymous write device may confirm that the zone was deleted. The second request may include a second zone (zone 2 in this example) to be deleted. The anonymous write device may confirm that the zone was deleted. The physical offset where the file was stored in the physical block mapping 1120 of the anonymous write device is mapped by the file system so that the logical block address associated with the file or data at file system mapping 1110 is associated with the corresponding physical block address at anonymous write device mapping 1120.

Figure 12:
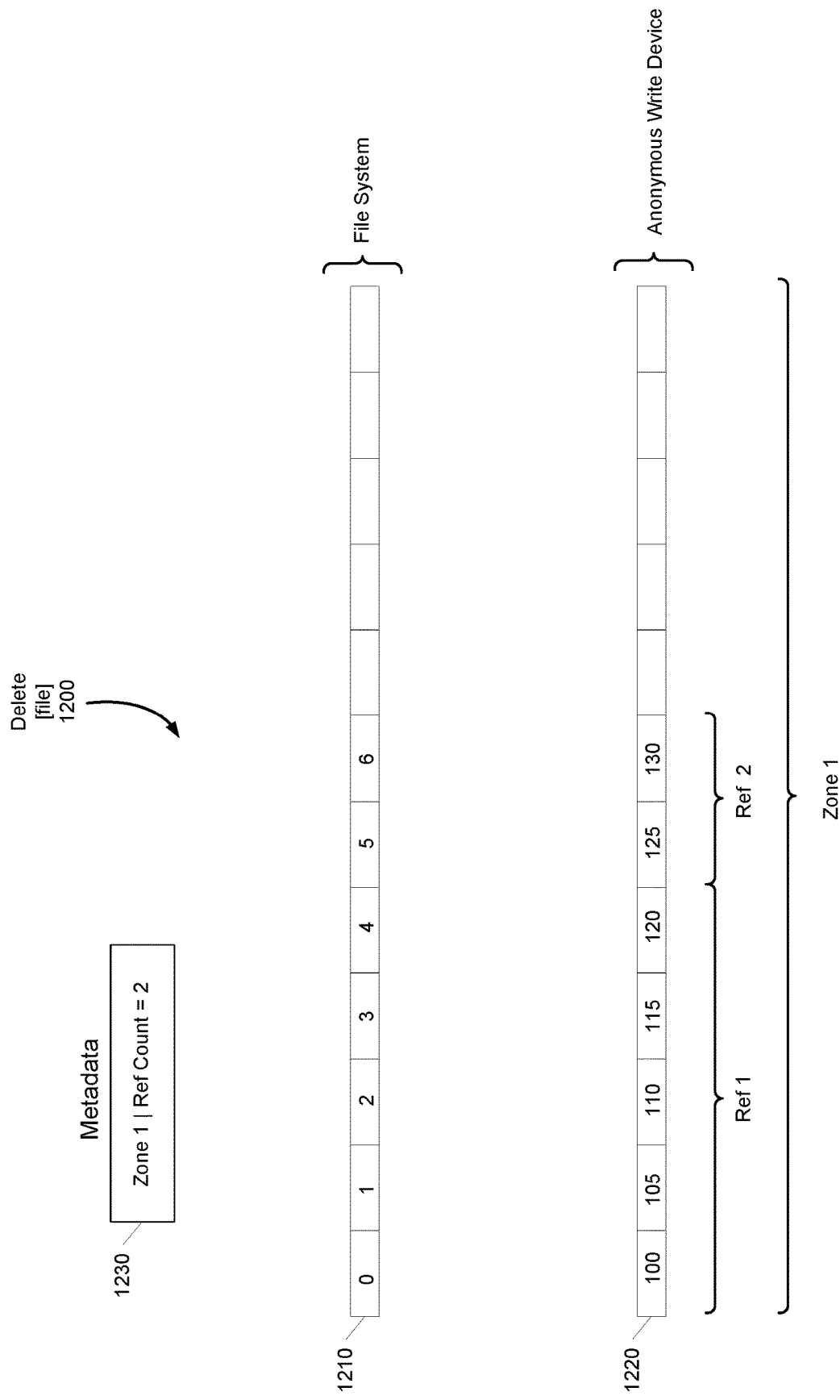
FIG. 12 is an example diagram depicting implementation of a file delete operation.
Figure 13:
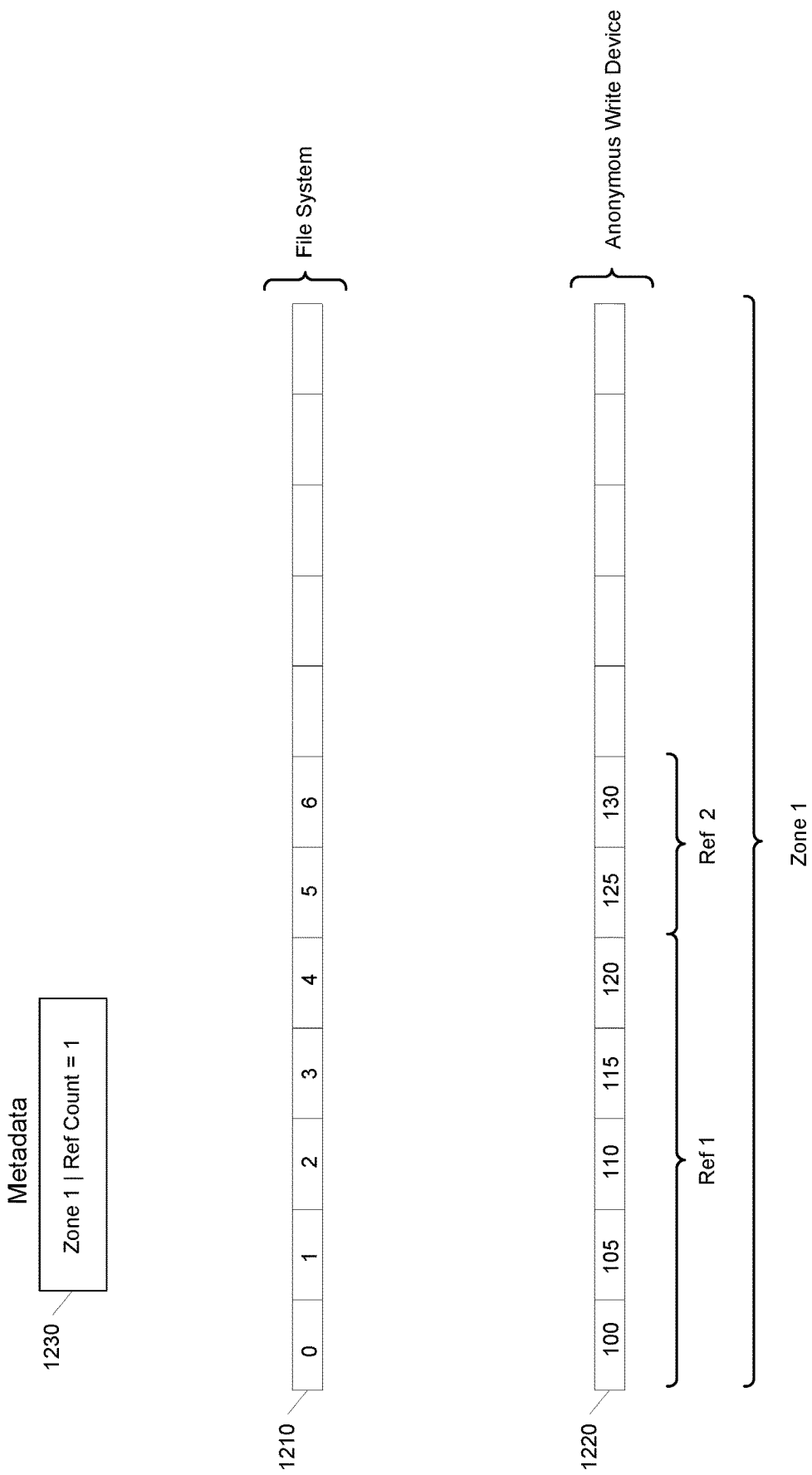
FIG. 13 is an example diagram depicting implementation of a file delete operation.
Figure 14:
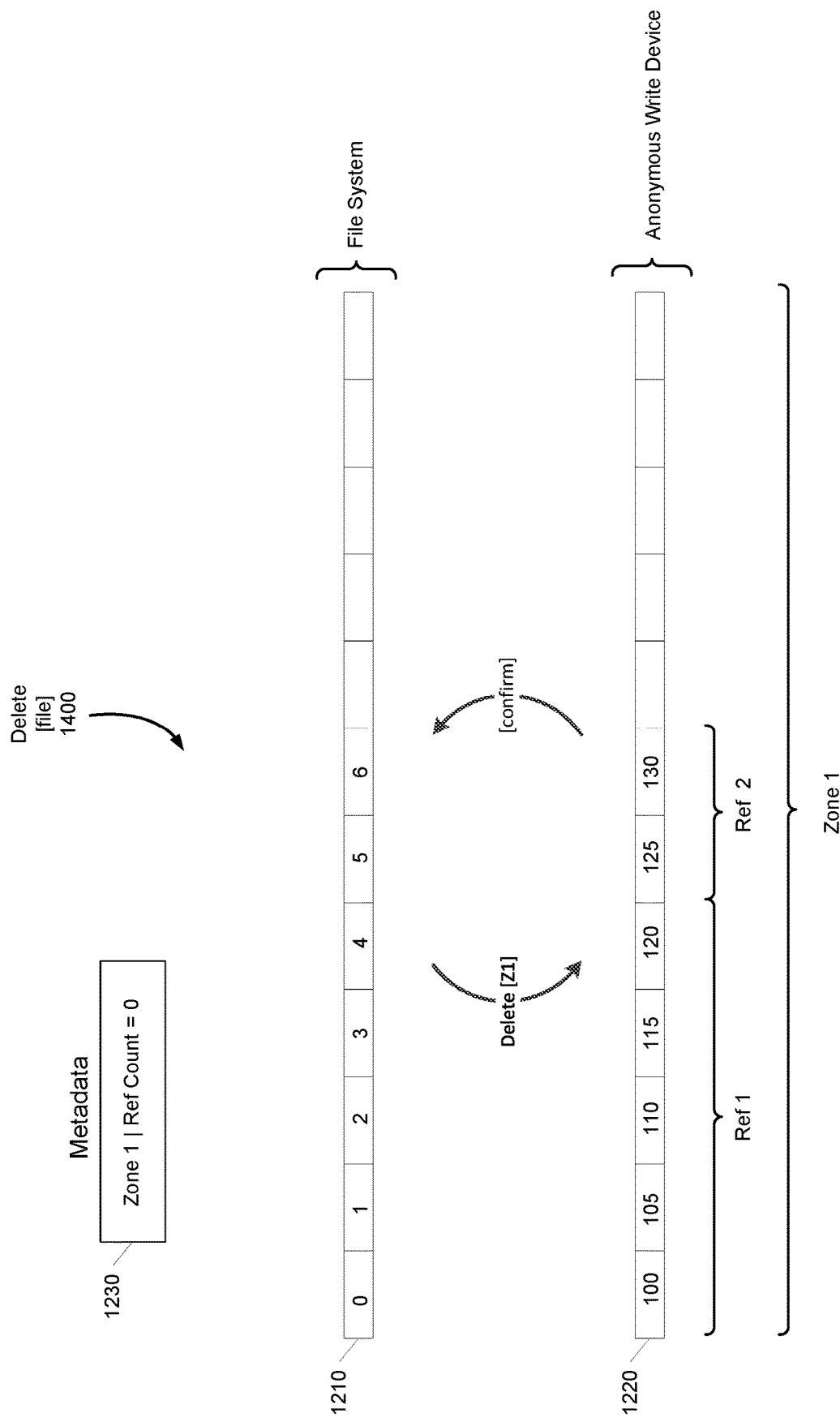
FIG. 14 is an example diagram depicting implementation of a file delete operation.

FIG. 12 illustrates an example where two or more files share the same zone. In this example, zone 1 is associated with metadata 1230 that includes a reference count indicating the zone and that there are two files indicated by the reference count that is stored in the zone. When a file is to be deleted from zone 1, since the contents of the zone cannot be deleted because the zone still contains data, the file system may update its metadata to indicate that the file has deleted status and is not allocated. FIG. 13 illustrates that the reference count in metadata 1230 is reduced to 1. Since the anonymous write device mapping 1220 indicates a second reference file is stored, the zone is not deleted at this time. FIG. 14 illustrates that the second file stored in zone is to be deleted. The file system may update its metadata to indicate that the file has deleted status and is not allocated. The file system may further update the reference count in metadata 1230 to zero. Since there are no more files in zone 1 that are currently in use by the file system, the content in the zone are deleted or released for future writes. FIG. 14 illustrates that the delete request 1400 results in the file system generating a request that the contents of the zone be deleted. The file system may translate the delete request to a request to the anonymous write device. The request may include a zone (zone 1 in this example) to be deleted. The anonymous write device may confirm that the zone was deleted. The physical offset where the file was stored in the physical block mapping 1220 of the anonymous write device is mapped by the file system so that the logical block address associated with the file or data at file system mapping 1210 is associated with the corresponding physical block address at anonymous write device mapping 1220, which in this example results in the mapping showing that the physical blocks indicated by mapping 1220 are not mapped to any logical blocks in file system mapping 1210.

The underlying devices need not strictly be only anonymous write devices. A storage stack can be implemented that can provide an abstracted file system interface that abstracts the details of the underlying storage devices from the file system user. The storage stack may manage I/O requests to allow, for example, prioritizing throughput and fast write commitments as a priority over fast retrievals.

As used herein, "storage stack" refers to an entity that may include a layering of various drivers, filters, encryption logic, antivirus logic, etc. that may be used to handle transfers/transformation of data/information from main memory to other storage. For example, for I/O requests (e.g., "read/write" requests), a block of data may be "packaged" (e.g., using a construct such as an IRP (I/O Request Packet)) and passed down the stack; thus, entities in the stack handle the transfer of that data from main memory to storage. Generally, such "I/O" operations (e.g., "read/write" operations) involve more processing time (and hence, more delay time) than traditional "load/store" operations that may occur directly between a CPU and main memory (e.g., with no "storage stack" involvement in such operations).

The term "file system" is used by way of example and the discussion of example techniques herein may also be applied to other types of file systems. In this context, a "file system" may include one or more hardware and/or software components that organize data that is persisted. For example, persisted data may be organized in units that may be referred to as "files"—and thus, a "file system" may be used to organize and otherwise manage and/or control such persisted data. For example, a "file" may be associated with a corresponding file name, file length, and file attributes. A file handle may include an indicator (e.g., a number) used by the file system to uniquely reference a particular active file.

Figure 15:
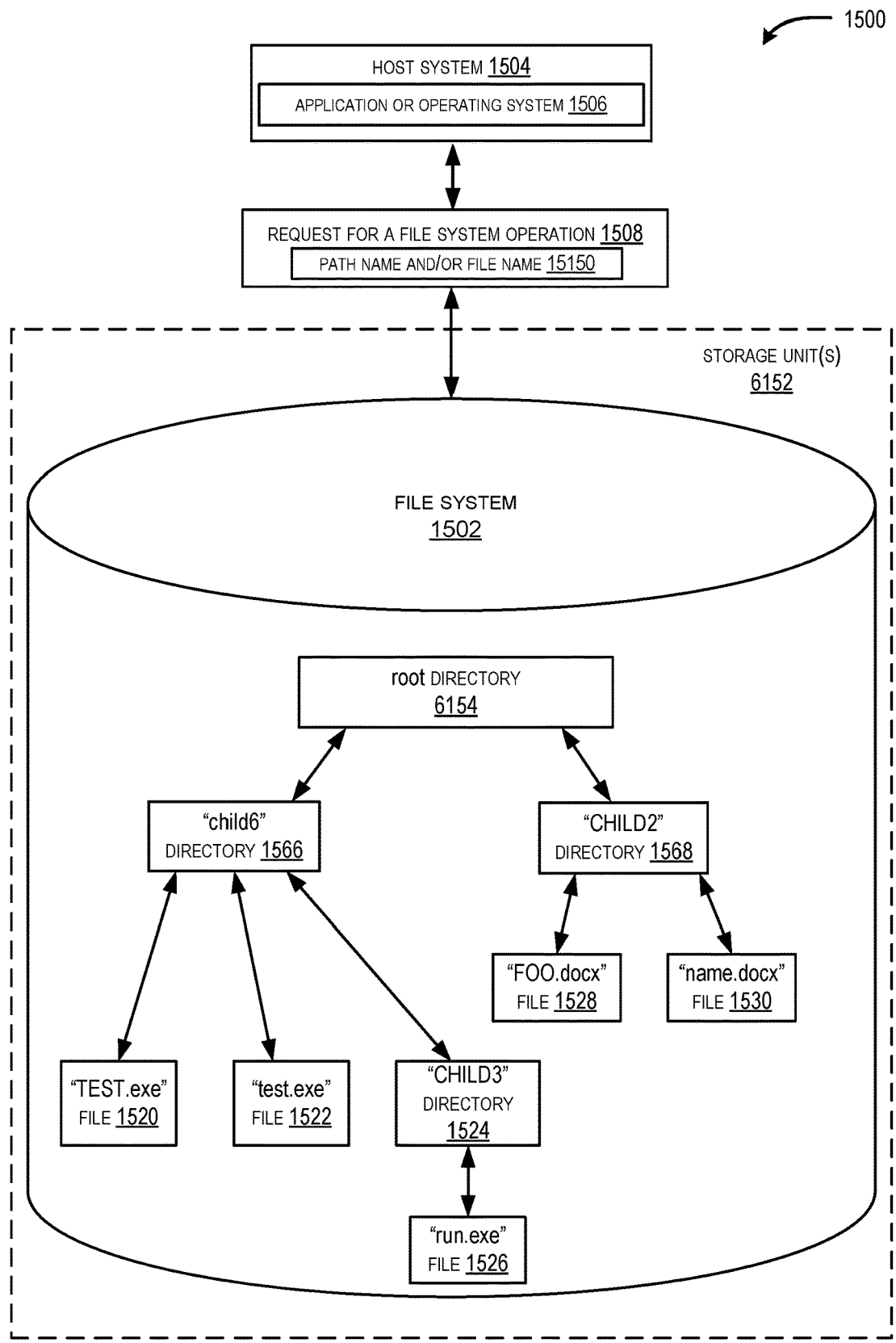
FIG. 15 is an example diagram depicting an example file system.

FIG. 15 is an example diagram 1500 depicting a file system 1502. In various examples, the file system 1502 can support an operating system of a device. In further examples, the file system 1502 can be part of a file hosting platform including, but not limited to, DROPBOX, BOX, GOOGLE DRIVE, MEGA, PCLOUD, SUGARSYNC, AMAZON DRIVE, and/or MICROSOFT ONEDRIVE. To this end, the file system 1502 is configured to interact with a host system 1504 (e.g., a computing device, a server, etc.). The host system 1504 can include an application or an operating system 1506, or some other module, that initiates a request for a file system operation 1508 while being executed on the host system 1504. A request for a file system operation may be referred to herein as a "request". Example file system operations include, but are not limited to: opening a file, deleting a file, writing to a file, reading from a file, replacing a file, copying a file, moving a file, searching for a file (e.g., as part of a pattern matching query), creating a file, etc.

In various examples, a file system can comprise one or more layers. For instance, a first "logical" layer of a file system is configured to control interactions with an operating system or an application of a host system. The logical layer can provide an application program interface (API) for receiving requests for file system operations and for passing the request to a "virtual" layer and/or a "physical" layer of the file system for processing. A virtual layer is an interface that supports multiple concurrent instances of a physical file system. The physical layer handles the physical operation of a storage unit (e.g., a disk). For instance, the physical layer processes physical blocks being read or written, the physical layer handles buffering and memory management, and/or the physical layer is responsible for the placement of blocks in specific locations on the storage unit. The layers described above may be separate, or their functions can be combined such that a file system is not comprised of separate layers.

The request 1508 includes a path name and/or a file name 15150 that identifies a file stored in the file system 1502 on which to perform the requested file system operation. A path name can include components useable by the file system 1502 to navigate the hierarchical structure of the file system 1502 in order to search for and locate the file. As described above, an individual component in a path name can identify, for example, a host device or a network device that contains the file (e.g., a server), a hardware device such as a storage unit (e.g., a drive), a directory, a file name for the file (e.g., a base file name), and a file type (e.g., a file format or file extension). At least some of the components of a path name can reflect the hierarchical structure of the files system 1502 and can be separated by a delimiting character (e.g., a slash "/", a backslash character "\", a colon ":", etc.). In some instances, reference to a "file name", as used herein, can include both a file name component and a file type component (e.g., a file name can be "run.exe").

The file system 1502 can be persistently stored on storage unit(s) 6152. A storage unit 6152 can be a hard disk drive or a solid-state drive. Examples of a storage unit 6152 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center). A storage unit 6152 can be local to the host system 1504 (e.g., local storage) or a storage unit 6152 can be remotely located such that the file system 1502 is accessed by the host system 1504 over a network. In various examples, one or more storage units 6152 can comprise a volume or a logical drive.

An individual directory in the file system 1502 can include one or more files and/or one or more directories. The hierarchical structure of the directories and/or files illustrated in FIG. 6 is provided for ease of discussion with respect to the various examples described herein.

Figure 16:
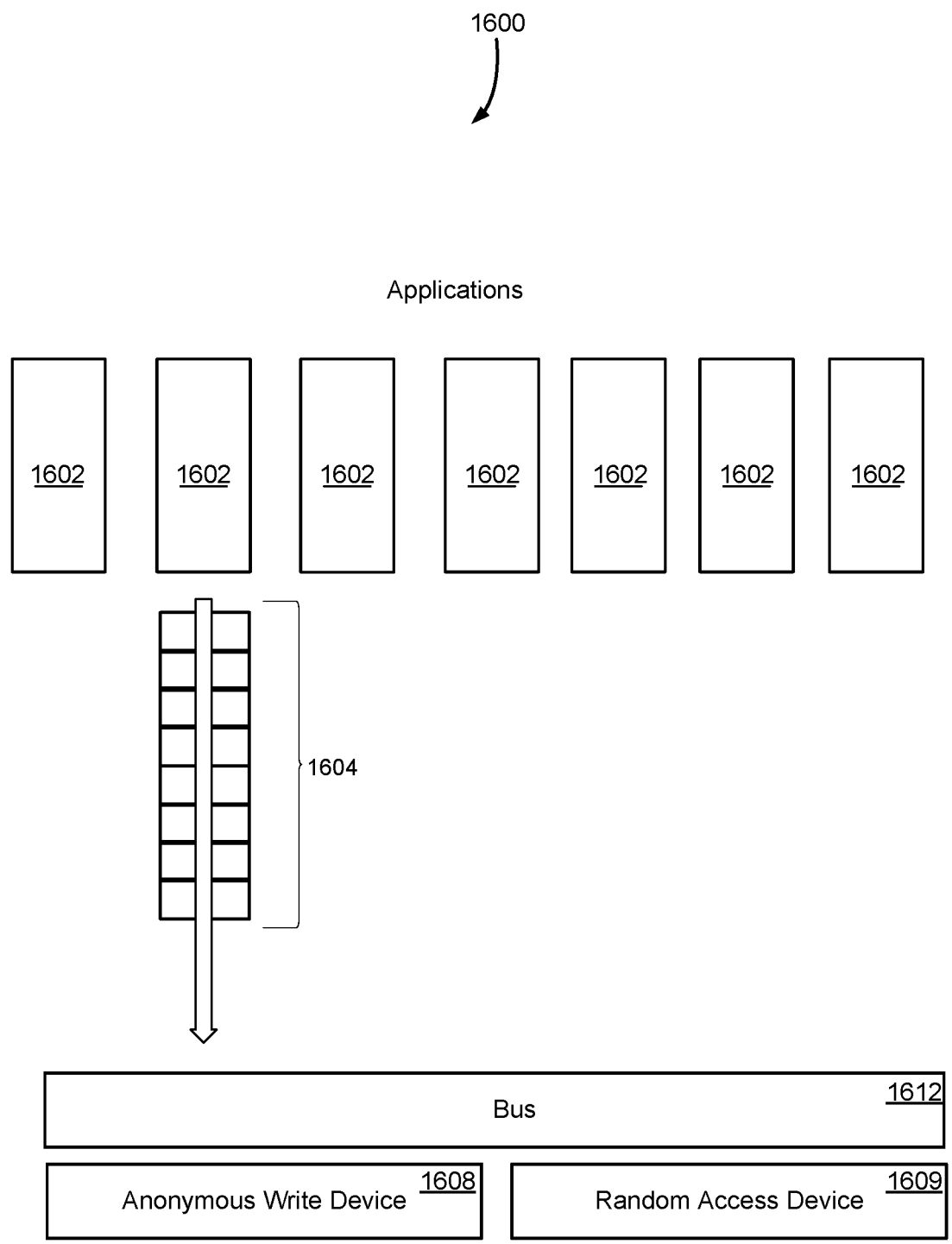
FIG. 16 is an example diagram a storage stack and storage devices in accordance with the present disclosure.

Referring to FIG. 16, illustrated is a computing environment 1600 that may be viewed as a collection of shared computing resources and shared infrastructure. The computing environment may include a number of applications 1602 that are running in the computing environment 1600. For example, the computing environment 1600 may be a virtualized computing environment may include virtual machine containers. The virtual machine containers may be hosted on physical hosts that may vary in hardware and/or software configurations. Each container may be capable of hosting a virtual machine.

Computing environment 1600 may also include one or more routers (not shown on FIG. 16) which may service multiple physical hosts to route network traffic. A controller or provisioning server (not shown in FIG. 16) may include a memory and processor configured with instructions to manage workflows for provisioning and de-provisioning computing resources as well as detecting accessing storage resources. As shown in FIG. 16, an application 1602 may access a bus 1612 to read or write data to anonymous write device 1608 or random access device 1609. The random access device 1609 may comprise, for example, an SSD. In order to do so, services provided by stack 1604 comprising a number of layers are traversed such as file system, storage, and other stack layers. As discussed, the application of the described techniques is illustrated in the context of virtualized services but are not limited to virtualized services. Any application that accesses or otherwise utilizes storage devices and services may implement the described techniques.

The applications 1602 may be configured to read and write files to the devices 1608 and 1609 by communicating with the storage stack 1604, and the storage stack 1604 may, in turn, communicate with the storage drivers (not shown in FIG. 16). The applications 1602 may instruct the storage stack 1604 which ID to associate with a given file. The storage stack 1604 may be configured to expose an application programming interface (API) (not shown in FIG. 16) to the applications 1602.

Figure 17:
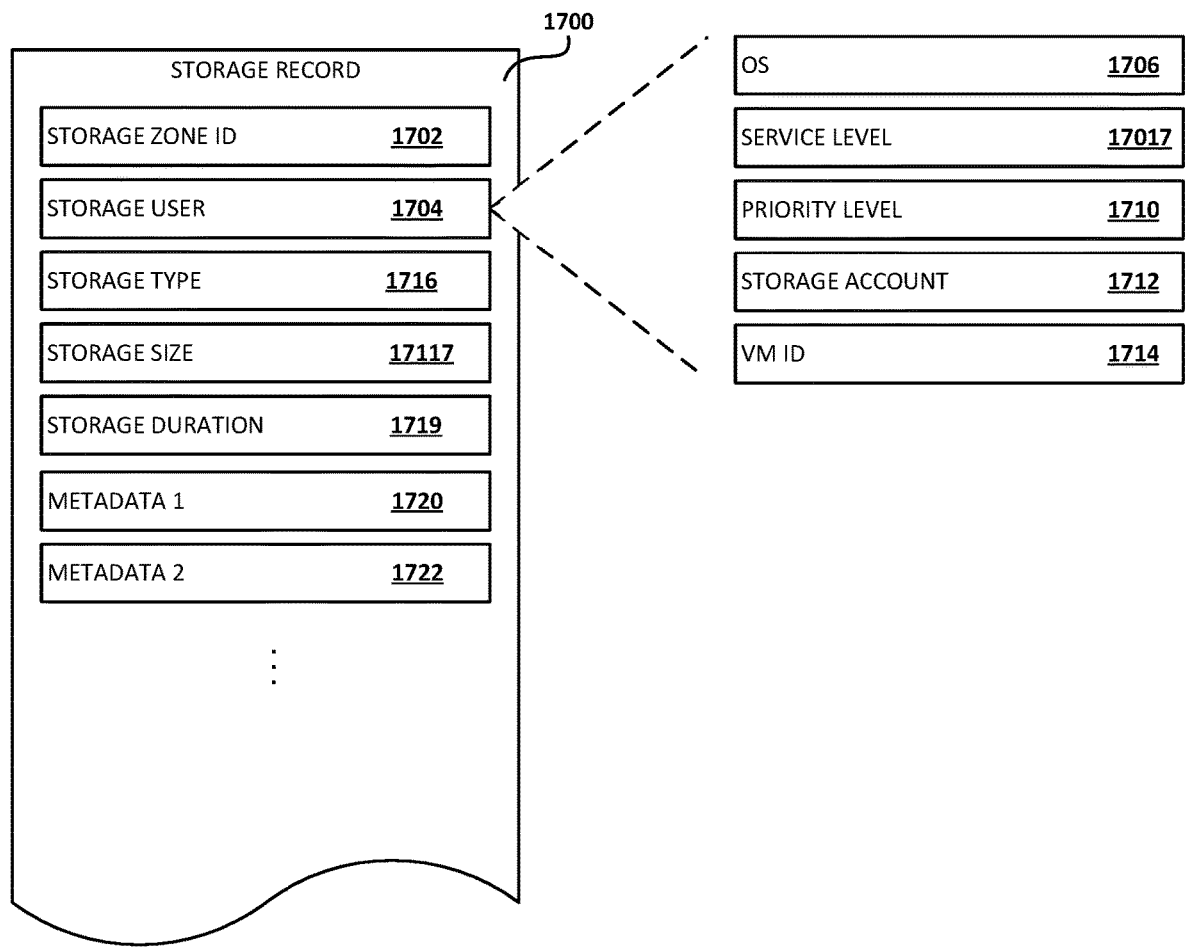
FIG. 17 illustrates a diagram depicting an example data structure in accordance with the present disclosure.

FIG. 17 is a data structure diagram showing a number of data elements stored in a storage record 1700 storing metadata for an append only storage service. It will be appreciated by one skilled in the art that the data structure shown in the figure may represent a data file, a database table, an object stored in a computer storage, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Each storage record 1700 may contain a storage area ID 1702 identifying the storage area or zone for whom the storage record 1700 is created. According to one embodiment, each storage record 1700 may also contain a storage user field 1704 identifying the various functions or users who are allowed to use the storage service. In one example, the storage user field 1704 may include OS version 1706, service level 17017, priority level 1710, storage account 1712, VM ID 1714, and the like. The storage record 1700 may also contain storage type 1716 indicating, for example, if the storage is random access or append only.

The storage record 1700 may also contain information regarding a storage size 17117. The storage record 1700 may contain a storage size 1719 indicating, for example, the length of time that the file should be stored before deletion. The storage record 1700 may further contain information regarding one or more metadata 1720 and 1722A-1720N. It will be appreciated that the reservation record 1700 may contain additional data elements beyond those shown in FIG. 17 and described above that are utilized in conjunction with reserve storage areas.

Figure 18:
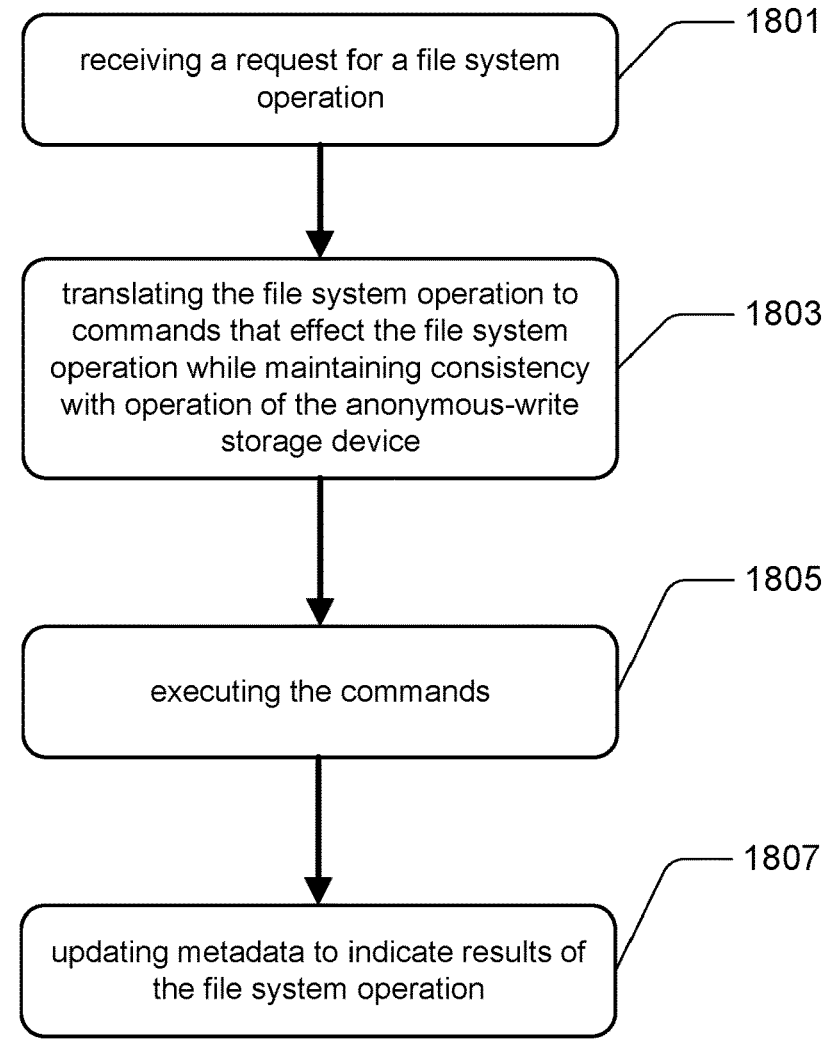
FIG. 18 is a flow diagram of an example process in accordance with the present disclosure.
Figure 19:
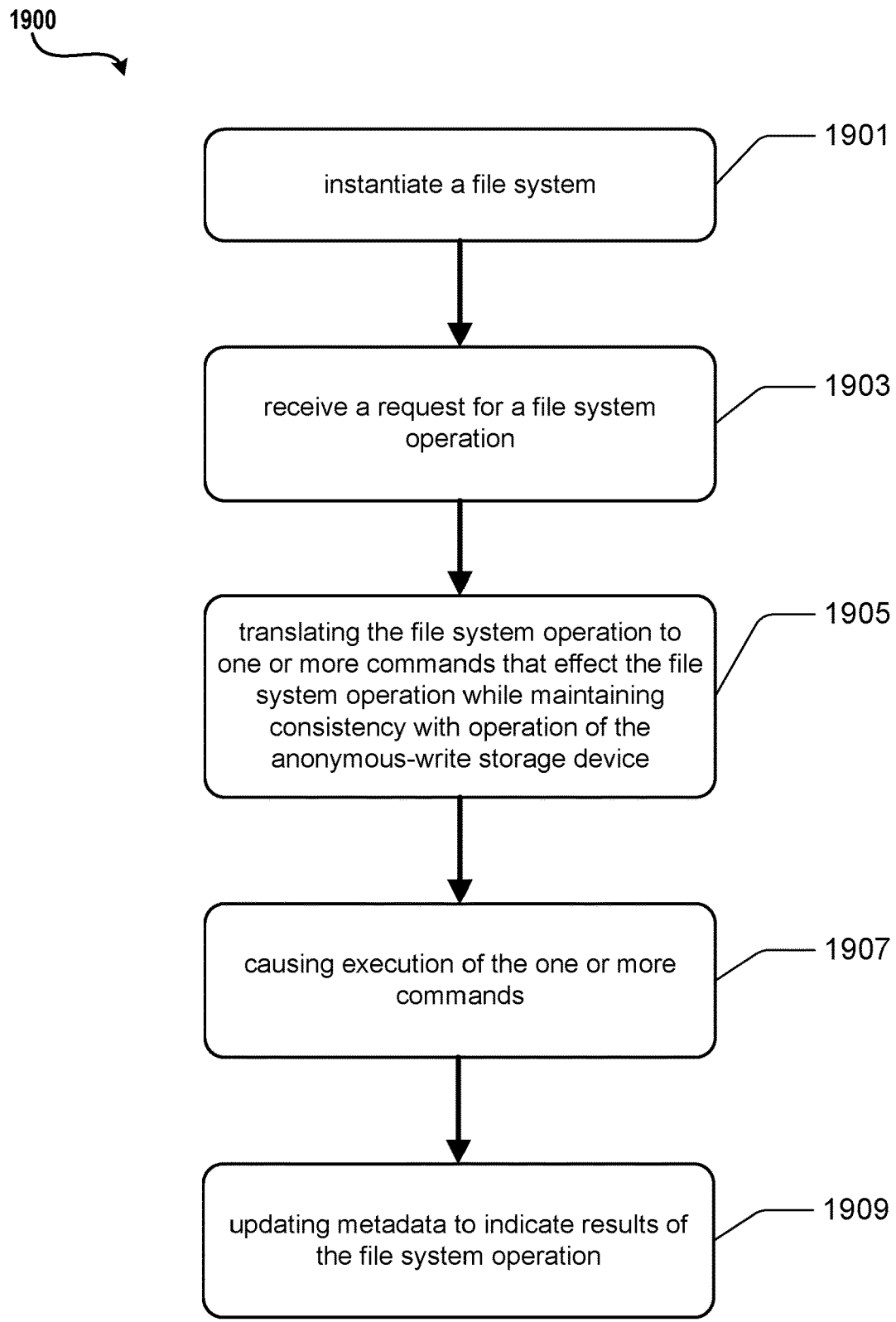
FIG. 19 is a flow diagram of an example process in accordance with the present disclosure.

Each of FIGS. 18 and 19 is a flow diagram of an example process of the techniques described herein. It should be understood by those of ordinary skill in the art that the operations of the processes disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims. Moreover, the operations can be performed in accordance with the examples provided above, with respect to any one of FIGS. 1-17.

Turning now to FIG. 18, illustrated is an example operational procedure for implementing a file system in a system comprising an anonymous-write storage device in accordance with the present disclosure. The operational procedure may be implemented in a system comprising one or more computing devices. Referring to FIG. 18, operation 1801 illustrates receiving, by the file system from an application, a request for a file system operation that comprises semantics of the file system and is agnostic of semantics of the anonymous-write storage device.

Operation 1801 may be followed by operation 1803. Operation 1803 illustrates responsive to receiving the request, translating, by the file system, the file system operation to commands that effect the file system operation while maintaining consistency with operation of the anonymous-write storage device.

Operation 1803 may be followed by operation 1805. Operation 1805 illustrates executing the commands. In an embodiment, the commands comprise one or more of:
  updating file system metadata,
  sending a request to the anonymous-write storage device, and
  receiving a response from the anonymous-write storage device. In an embodiment, the anonymous-write storage device is configured to write data in an append-only format and determine locations of data write operations agnostic of input of a write location from the file system Operation 1805 may be followed by operation 1807. Operation 1807 illustrates updating, by the file system, metadata to indicate results of the file system operation.

Turning now to FIG. 19, illustrated is an example operational procedure for implementing a file system in a system comprising an anonymous-write storage device in accordance with the present disclosure. The operational procedure may be implemented in a system comprising one or more computing devices. Referring to FIG. 19, operation 1901 illustrates instantiating a file system.

Operation 1901 may be followed by operation 1903. Operation 1903 illustrates receiving a request for a file system operation that comprises semantics of the file system.

Operation 1903 may be followed by operation 1905. Operation 1905 illustrates responsive to receiving the request, translating the file system operation to one or more commands that effect the file system operation while maintaining consistency with operation of an anonymous-write storage device. In an embodiment, the one or more commands comprise one or more of updating file system metadata, sending a request to the anonymous-write storage device, or receiving a response from the anonymous-write storage device. In an embodiment, the anonymous-write storage device is configured to write data in an append-only format and determine locations of data write operations agnostic of input of a write location from the file system.

Operation 1905 may be followed by operation 1907. Operation 1907 illustrates causing execution of the one or more commands. Operation 1907 may be followed by operation 1909. Operation 1909 illustrates updating metadata to indicate results of the file system operation.

Figure 20:
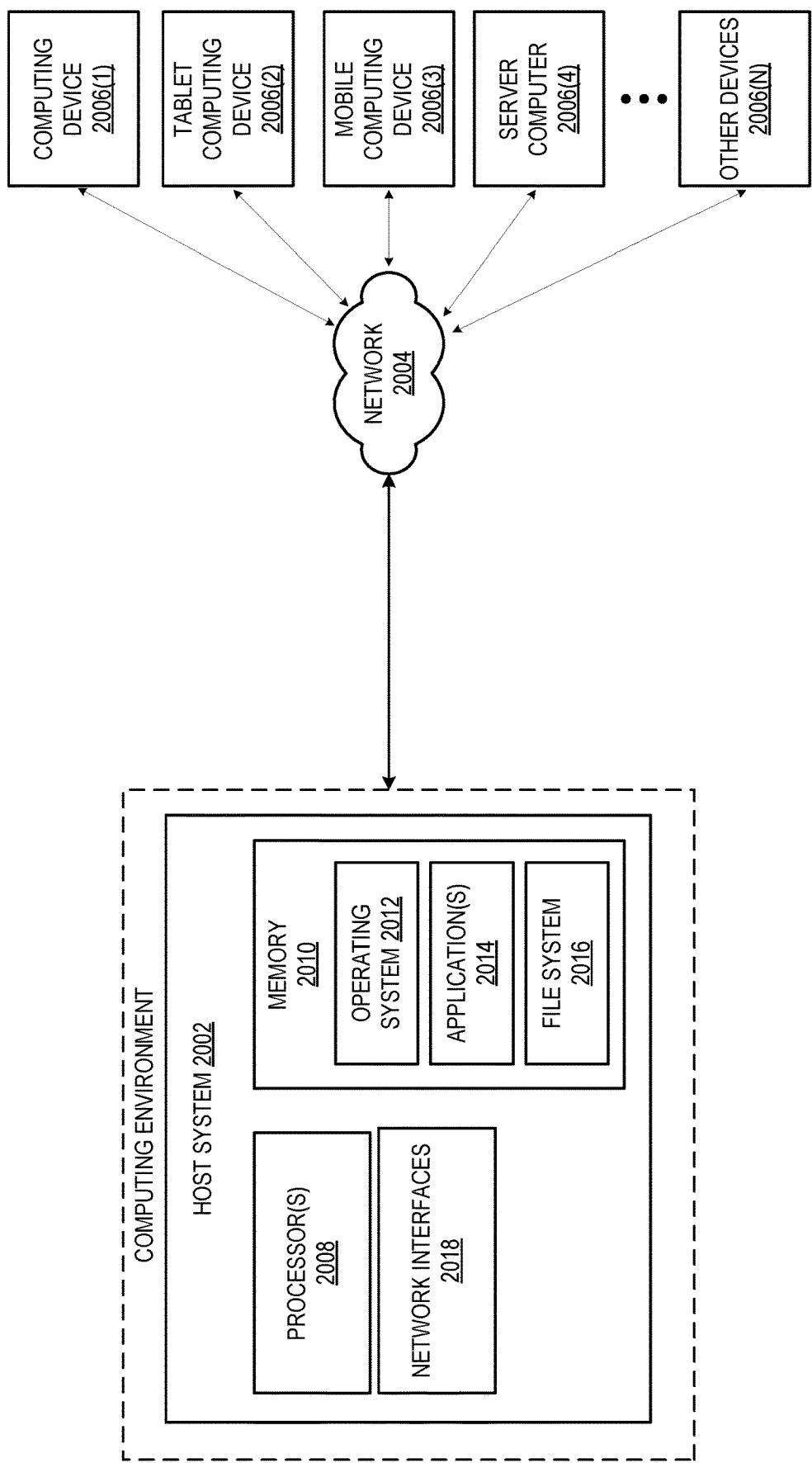
FIG. 20 illustrates an example computing environment capable of executing the techniques and processes described herein.

FIG. 20 illustrates an example computing environment capable of executing the techniques and processes described above with respect to FIGS. 1-19. In various examples, the computing environment comprises a host system 2002. In various examples, the host system 2002 operates on, in communication with, or as part of a network 2004.

The network 2004 can be or can include various access networks. For example, one or more client devices 2006(1) . . . 2006(N) can communicate with the host system 2002 via the network 2004 and/or other connections. The host system 2002 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 2002 can be provided by one or more servers that are executing as part of, or in communication with, the network 2004. A server can host various services, virtual machines, portals, and/or other resources. For example, a can host or provide access to one or more portals, Web sites, and/or other information.

The host system 2002 can include processor(s) 1208 memory 2010. The memory 2010 can comprise an operating system 2012, application(s) 2014, and/or a file system 2016 (e.g., file system 102 along with its cache 802). Moreover, the memory 2010 can comprise the storage unit(s) 202 described above with respect to FIGS. 1-9.

The processor(s) 2008 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 2010.

The memory 2010 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 2002 can communicate over the network 2004 via network interfaces 2018. The network interfaces 2018 can include various types of network hardware and software for supporting communications between two or more devices.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein encompasses the subject matter set forth in the following example clauses.

Example Clause A, a computer-implemented method for implementing a file system in a system comprising an anonymous-write storage device, the method comprising:
  receiving, by the file system from an application, a request for a file system operation that comprises semantics of the file system and is agnostic of semantics of the anonymous-write storage device;
  responsive to receiving the request, translating, by the file system, the file system operation to commands that effect the file system operation while maintaining consistency with operation of the anonymous-write storage device;
  executing the commands, the commands comprising:
  updating file system metadata,
  sending a request to the anonymous-write storage device, and
  receiving a response from the anonymous-write storage device,
  wherein the anonymous-write storage device is configured to write data in an append-only format and determine locations of data write operations agnostic of input of a write location from the file system; and
  updating, by the file system, metadata to indicate results of the file system operation.

Example Clause B, the computer-implemented method of Example Clause A, further comprising:
  sending the request to the anonymous-write storage device, the request indicative of the translated operation, a data object, and a target zone within the anonymous-write storage device.

Example Clause C, the computer-implemented method of any one of Example Clauses A through B, further comprising receiving, from the anonymous-write storage device, an offset indicating where the data object was stored relative to the target zone.

Example Clause D, the computer-implemented method of any one of Example Clauses A through C, further comprising translating, by the file system, the offset to a logical address in an address space of the file system.

Example Clause E, the computer-implemented method of any one of Example Clauses A through D, wherein the file system operation is one of create, delete, read, or write.

Example Clause F, the computer-implemented method of any one of Example Clauses A through E, wherein the file system communicates with the anonymous-write storage device via a driver to request that a data object be stored on the device.

Example Clause G, the computer-implemented method of any one of Example Clauses A through F, wherein the storage area of the device includes a plurality of zones that are usable to organize the storage area of the anonymous-write storage device.

Example Clause H, the computer-implemented method of any one of Example Clauses A through G, wherein the file system tracks locations of stored files relative to an address space of the file system by translating offsets and zones of the anonymous-write storage device to the file system address space.

Example Clause I, the computer-implemented method of any one of Example Clauses A through H, wherein the operation is a create operation, further comprising generating metadata for a file and associating an identifier for the file with the create operation.

Example Clause J, the computer-implemented method of any one of Example Clauses A through H, wherein the operation is a write operation, and wherein the request includes a zone for the write operation and a data or file for the write operation.

Example Clause K, the computer-implemented method of any one of Example Clauses A through H, wherein the operation is a read operation, and wherein the request includes a zone for the read operation and an offset for the read operation.

Example Clause L, the computer-implemented method of any one of Example Clauses A through H, wherein the operation is a delete operation, and wherein the request includes a zone for the delete operation.

While Example Clauses A through L are described above with respect to a computer-implemented method, it is understood in the context of this disclosure that the subject matter of Example Clauses A through L can additionally or alternatively be implemented by a system or device or computer readable medium.

Example Clause M, system comprising:
  one or more data processing units; and
  a computer-readable medium having encoded thereon computer-executable instructions to cause the one or more data processing units to perform operations comprising:
    receive a request for a file system operation that comprises semantics of the file system and is agnostic of semantics of the anonymous-write storage device;
    responsive to receiving the request, translating the file system operation to one or more commands that effect the file system operation while maintaining consistency with operation of the anonymous-write storage device, wherein:
      the one or more commands comprise one or more of updating file system metadata, sending a request to the anonymous-write storage device, or receiving a response from the anonymous-write storage device,
      the anonymous-write storage device is configured to write data in an append-only format and determine locations of data write operations agnostic of input of a write location from the file system;
    causing execution of the one or more commands; and
    updating metadata to indicate results of the file system operation.

Example Clause N, the system of Example Clause M, wherein the operation is a overwrite operation, and wherein the request includes a zone for the write operation and a data object for the write operation; wherein the file system is further configured to:

receive an offset indicating where the data object was stored relative to the zone; and replacing an offset mapped to a current logical memory address associated with a location for the overwrite with the offset received from the anonymous-write storage device.

Example Clause O, the system of any one of Example Clauses M through N, wherein the operation is a write operation to a new file location in the file system, and wherein the request includes a zone for the write operation and a data object for the write operation; wherein the file system is further configured to:

receive an offset indicating where the data object was stored relative to the zone; and updating metadata to map a logical memory address associated with a location for the write with the offset received from the anonymous-write storage device.

Example Clause P, the system of any one of Example Clauses M through O, wherein the operation is a delete operation and the storage area of the device is configured to store one file per zone, and wherein the request includes a zone for the delete operation.

Example Clause Q, the system of any one of Example Clauses M through P, wherein the operation is a delete operation and the storage area of the device is configured to store multiple zones per file, and wherein the request includes a plurality of zones for the delete operation.

Example Clause R, the system of any one of Example Clauses M through Q, wherein the operation is a delete operation and the storage area of the device is configured to store multiple files per zone, and wherein the file system is further configured to:

update metadata to indicate that the file is deleted;

decrementing a number of files that are stored in the zone; and when the number of files reaches zero, sending a request to the device to delete the zone.

While Example Clauses M through R are described above with respect to a system, it is understood in the context of this disclosure that the subject matter of Example Clauses M through R can additionally or alternatively be implemented by a device or method or computer readable medium.

Example Clause S, a computer-readable medium having encoded thereon computer-executable instructions that, when executed, cause one or more processing units of a computing device to execute a method comprising:

instantiate a file system, the file system configured to:

receive a request for a file system operation that comprises semantics of the file system;

responsive to receiving the request, translating the file system operation to one or more commands that effect the file system operation while maintaining consistency with operation of an anonymous-write storage device, wherein:

the one or more commands comprise one or more of updating file system metadata, sending a request to the anonymous-write storage device, or receiving a response from the anonymous-write storage device, wherein:

the anonymous-write storage device is configured to write data in an append-only format and determine locations of data write operations agnostic of input of a write location from the file system;

causing execution of the one or more commands; and updating metadata to indicate results of the file system operation.

Example Clause T, the computer-readable medium of any one of Example Clause S, wherein the file system operation is one of create, delete, read, or write.

While Example Clauses S through T are described above with respect to a computer-readable medium, it is understood in the context of this disclosure that the subject matter of Example Clauses S through T can additionally or alternatively be implemented by a method or via a device or via a system.

What is claimed is:

1. A computer-implemented method for implementing a file system in a system comprising a plurality of types of storage devices including an anonymous-write storage device and a random-access storage device, the method comprising:

receiving, by the file system from an application, a request for a file system operation that comprises semantics of the file system and wherein the request is agnostic of semantics of types of storage devices;

based at least in part on an operational priority of storage services provided by the plurality of types of storage devices, selecting the anonymous-write storage device for fulfillment of the request, wherein the operational priority comprises prioritizing throughput and write speed over retrieval speed;

responsive to the selecting of the anonymous-write storage device and receiving the request, translating, by the file system, the file system operation to commands that effect the file system operation while maintaining consistency with operation of the anonymous-write storage device;

executing the commands, the commands comprising:

updating file system metadata, sending a request to the anonymous-write storage device, and receiving a response from the anonymous-write storage device, wherein:

the anonymous-write storage device is configured to write data in an append-only format and determine locations of data write operations agnostic of input of a write location from the file system, a storage area of the anonymous-write storage device includes a plurality of logical zones that are exposed to the file system, when two or more files share a same logical zone, the same logical zone is associated with a reference count indicating how many files are stored in the same logical zone, and the anonymous-write storage device is configured to translate the plurality of logical zones to physical zones of the anonymous-write storage device; and updating, by the file system, metadata to indicate results of the file system operation.

2. The computer-implemented method of claim 1, further comprising:

sending the request to the anonymous-write storage device, the request indicative of the translated file system operation, a data object, and a target zone within the anonymous-write storage device.

3. The computer-implemented method of claim 2, further comprising:

receiving, from the anonymous-write storage device, an offset indicating where the data object was stored relative to the target zone.

4. The computer-implemented method of claim 3, further comprising:
translating, by the file system, the offset to a logical address in an address space of the file system.

5. The computer-implemented method of claim 1, wherein the file system operation is one of create, delete, read, or write.

6. The computer-implemented method of claim 5, wherein the file system operation is a create operation, further comprising generating metadata for a file and associating an identifier for the file with the create operation.

7. The computer-implemented method of claim 5, wherein the file system operation is a write operation, and wherein the request includes a zone for the write operation and a data or file for the write operation.

8. The computer-implemented method of claim 5, wherein the file system operation is a read operation, and wherein the request includes a zone for the read operation and an offset for the read operation.

9. The computer-implemented method of claim 5, wherein the file system operation is a delete operation, and wherein the request includes a zone for the delete operation.

10. The computer-implemented method of claim 1, wherein the file system communicates with the anonymous-write storage device via a driver to request that a data object be stored on the device.

11. The computer-implemented method of claim 1, wherein a storage area of the device includes a plurality of zones that are usable to organize the storage area of the anonymous-write storage device.

12. The computer-implemented method of claim 1, wherein the file system tracks locations of stored files relative to an address space of the file system by translating offsets and zones of the anonymous-write storage device to the file system address space.

13. A system comprising:
a plurality of types of storage devices including an anonymous-write storage device and a random-access storage device;
one or more data processing units; and
a computer-readable medium having encoded thereon computer-executable instructions to cause the one or more data processing units to instantiate a file system, the file system configured to:
receive a request for a file system operation that comprises semantics of the file system and is agnostic of semantics of types of storage devices;
based at least in part on an operational priority of storage services provided by the plurality of types of storage devices, selecting the anonymous-write storage device for fulfillment of the request, wherein the operational priority comprises prioritizing throughput and write speed over retrieval speed;
responsive to the selecting of the anonymous-write storage device and receiving the request, translating the file system operation to one or more commands that effect the file system operation while maintaining consistency with operation of the anonymous-write storage device, wherein:
the one or more commands comprise one or more of updating file system metadata, sending a request to the anonymous-write storage device, or receiving a response from the anonymous-write storage device,
the anonymous-write storage device is configured to write data in an append-only format and determine locations of data write operations agnostic of input of a write location from the file system;
a storage area of the anonymous-write storage device includes a plurality of logical zones that are exposed to the file system,
when two or more files share a same logical zone, the same logical zone is associated with a reference count indicating how many files are stored in the same logical zone, and
the anonymous-write storage device is configured to translate the plurality of logical zones to physical zones of the anonymous-write storage device;
causing execution of the one or more commands; and
updating metadata to indicate results of the file system operation.

14. The system of claim 13, wherein the file system operation is a overwrite operation, and wherein the request includes a zone for the overwrite operation and a data object for the overwrite operation; wherein the file system is further configured to:
receive an offset indicating where the data object was stored relative to the zone; and
replacing an offset mapped to a current logical memory address associated with a location for the overwrite with the offset received from the anonymous-write storage device.

15. The system of claim 13, wherein the file system operation is a write operation to a new file location in the file system, and wherein the request includes a zone for the write operation and a data object for the write operation; wherein the file system is further configured to:
receive an offset indicating where the data object was stored relative to the zone; and
updating metadata to map a logical memory address associated with a location for the write with the offset received from the anonymous-write storage device.

16. The system of claim 13, wherein the file system operation is a delete operation and a storage area of the device is configured to store one file per zone, and wherein the request includes a zone for the delete operation.

17. The system of claim 13, wherein the file system operation is a delete operation and a storage area of the device is configured to store multiple zones per file, and wherein the request includes a plurality of zones for the delete operation.

18. The system of claim 13, wherein the file system operation is a delete operation and a storage area of the device is configured to store multiple files per zone, and wherein the file system is further configured to:
update metadata to indicate that the file is deleted;
decrementing a number of files that are stored in the zone; and
when the number of files reaches zero, sending a request to the device to delete the zone.

19. A non-transitory computer-readable medium having encoded thereon computer-executable instructions that, when executed, cause one or more processing units of a computing device to execute a method comprising:
instantiate a file system, the file system configured to:
receive a request for a file system operation that comprises semantics of the file system;
based at least in part on an operational priority of storage services provided by a plurality of types of storage devices including an anonymous-write storage device and a random-access storage device, selecting the anonymous-write storage device for fulfillment of the request, wherein the operational priority comprises prioritizing throughput and write speed over retrieval speed;

responsive to the selecting of the anonymous-write storage device and receiving the request, translating the file system operation to one or more commands that effect the file system operation while maintaining consistency with operation of the anonymous-write storage device, wherein:

the one or more commands comprise one or more of updating file system metadata, sending a request to the anonymous-write storage device, or receiving a response from the anonymous-write storage device, wherein:

the anonymous-write storage device is configured to write data in an append-only format and determine locations of data write operations agnostic of input of a write location from the file system;

a storage area of the anonymous-write storage device includes a plurality of logical zones that are exposed to the file system, when two or more files share a same logical zone, the same logical zone is associated with a reference count indicating how many files are stored in the same logical zone, and the anonymous-write storage device is configured to translate the plurality of logical zones to physical zones of the anonymous-write storage device;

causing execution of the one or more commands; and updating metadata to indicate results of the file system operation.

20. The non-transitory computer-readable medium of claim 19, wherein the file system operation is one of create, delete, read, or write.

\* \* \* \* \*